(12) United States Patent
Otsu et al.

(10) Patent No.: US 10,333,611 B2
(45) Date of Patent: Jun. 25, 2019

(54) COMMUNICATION SYSTEM, TIME SYNCHRONIZATION METHOD, AND RADIO RELAY DEVICE

(71) Applicant: NEC CORPORATION, Tokyo (JP)

(72) Inventors: Makoto Otsu, Tokyo (JP); Shuhei Munetsugu, Tokyo (JP)

(73) Assignee: NEC CORPORATION, Minato-ku, Tokyo (JP)

( * ) Notice: Subject to any disclaimer, the term of this patent is extended or adjusted under 35 U.S.C. 154(b) by 105 days.

(21) Appl. No.: 15/524,410

(22) PCT Filed: Aug. 19, 2015

(86) PCT No.: PCT/JP2015/004126
§ 371 (c)(1),
(2) Date: May 4, 2017

(87) PCT Pub. No.: WO2016/072038
PCT Pub. Date: May 12, 2016

(65) Prior Publication Data
US 2018/0287688 A1  Oct. 4, 2018

Related U.S. Application Data

(63) Continuation of application No. PCT/JP2015/004126, filed on Aug. 19, 2015.

(30) Foreign Application Priority Data

Nov. 5, 2014  (JP) .................................. 2014-224840

(51) Int. Cl.
*H04L 12/28* (2006.01)
*H04B 7/14* (2006.01)
(Continued)

(52) U.S. Cl.
CPC .............. *H04B 7/14* (2013.01); *H04J 3/0658* (2013.01); *H04L 7/00* (2013.01); *H04B 7/2606* (2013.01)

(58) Field of Classification Search
USPC ......................................... 370/252, 503, 278
See application file for complete search history.

(56) References Cited

U.S. PATENT DOCUMENTS

2002/0057544 A1* 5/2002 Sugiura ................ H02H 1/0061
361/68
2014/0098706 A1 4/2014 Maruyama et al.
2015/0187209 A1* 7/2015 Brandt ................... G08C 19/00
340/12.22

FOREIGN PATENT DOCUMENTS

JP          05-161181 A    6/1993
JP       2012-175567 A    9/2010
(Continued)

OTHER PUBLICATIONS

International Search Report for PCT/JP2015/004126, dated Oct. 27, 2015 (PCT/ISA/210).

*Primary Examiner* — John Pezzlo
(74) *Attorney, Agent, or Firm* — Sughrue Mion, PLLC

(57) ABSTRACT

A first radio relay device (21) transmits a first radio frame in which a first pulse has been set, a second radio relay device (22) sends back a second radio frame in which a second pulse has been set according to detection of the first pulse from the received first radio frame, the first radio relay device (21) detects the second pulse from the received second radio frame, and either one of the relay devices adjusts a correction value included in the time synchronization packet using a transmission delay time between the two radio relay devices calculated based on at least the setting of the first pulse and the detection of the second pulse.

11 Claims, 11 Drawing Sheets

(51) Int. Cl.
*H04L 7/00* (2006.01)
*H04J 3/06* (2006.01)
*H04J 1/16* (2006.01)
*H04B 7/26* (2006.01)

(56) References Cited

FOREIGN PATENT DOCUMENTS

| | | |
|---|---|---|
| JP | 2012-034224 A | 2/2012 |
| JP | 2014-078781 A | 5/2014 |

* cited by examiner

COMMUNICATION SYSTEM, TIME SYNCHRONIZATION METHOD, AND RADIO RELAY DEVICE

CROSS REFERENCE TO RELATED APPLICATIONS

This application is a National Stage of International Application No. PCT/JP2015/004126 filed Aug. 19, 2015, claiming priority based on Japanese Patent Application No. 2014-224840, filed Nov. 5, 2014, the contents of all of which are incorporated herein by reference in their entirety.

TECHNICAL FIELD

The present invention relates to a communication system, a time synchronization method, and a radio relay device and, in particular, to a communication system, a time synchronization method, and radio relay devices for controlling the plurality of radio relay devices that relay communication by radio communication between communication devices that perform time synchronization.

BACKGROUND ART

In recent years, as a technology for performing time synchronization between communication devices, phase synchronization by a packet (for example, IEEE (Institute of Electrical and Electronics Engineers) 1588 etc.) has attracted attention instead of using a conventional technology of a GNSS (Global Navigation Satellite System) etc. for performing it. In IEEE 1588, a PTP (Precision Time Protocol) is defined as a protocol for accurately synchronizing times between communication devices in a network.

Generally, between a master device as a communication device that is a synchronization source of a time and a slave device as a communication device that is a synchronization destination of the time, relay devices that relay a PTP packet are installed. Here, in the case of the phase synchronization by the packet, large fluctuations are generated in transmission delay time by processing in the relay devices. Consequently, there is a Transparent Clock function as a function to reduce fluctuations in transmission delay at the time of relay in a communications network of an IEEE 1588 version 2.

In the Transparent Clock function in the master device, a retention time of the relay device is set in a correction field of an overhead of the PTP packet as a correction value of a time. Specifically, the relay device subtracts from the correction value a time (a count value or the like) at the time of the start of its processing, and adds to the correction value a time at the time of the end of its processing. Additionally, in the slave device, an arrival delay time from the master device to the slave device is corrected using the correction value in the PTP packet received from the master device.

Note that Patent Literature 1 discloses a technology in which in a case of relaying communication in multiple stages by a plurality of relay devices (slave devices) between a master device and a slave device that perform time synchronization, time synchronization is performed between the respective relay devices. In the technology according to Patent Literature 1, each slave device writes a measurement time (a processing delay time) of its internal processing in a measurement frame directed from the master device to the terminal slave device, and relays it.

CITATION LIST

Patent Literature

Patent Literature 1

Japanese Unexamined Patent Application Publication No. 2012-175567

SUMMARY OF INVENTION

Technical Problem

Here, there is a problem that it is difficult to maintain accuracy of the correction value of the correction field in a case where two or more radio relay devices relay communication between the master device and the slave device that perform time synchronization using the time synchronization packet, such as the PTP packet. The reason will be explained hereinafter.

First, it is in general, a communication is relayed by the two or more relay devices, as disclosed in Patent Literature 1, between the master device and the slave device that perform time synchronization. Additionally, in a case of using the PTP packet, each relay device updates the correction field twice at the time of start of its processing and at the end thereof, and thereby adds its processing delay time. Therefore, the more the number of relay devices increases, the more the number of updates increases, a total processing delay time of the respective relay devices increases, and as a result, an effect on a transmission time (an arrival time of data) between the master device and the slave device becomes larger.

Consequently, in order to reduce the number of updates of each relay device, a method can be considered in which the two relay devices are regarded as being one relay device, two updates of the correction field are performed in which a start time is subtracted from the correction value of the correction field at the time of the start of processing of one end of the first relay device and in which an end time is added to the correction value at the time of the end of processing of the other end of the second relay device and whereby the updated correction value is regarded as a total processing delay time of the two relay devices.

However, in the case of this method, times (counters or clocks indicating the times) need to be in synchronization with each other between the two relay devices. In a case where radio communication is used between the relay devices, there is a technique of embedding a synchronization pulse for synchronizing times in a radio frame of a radio communication section, to thereby synchronize the times between the relay devices. In the time synchronization by this technique, synchronization of count intervals (or intervals at which count values are cleared in a case where they have reached an upper-limit value) of the counters can be achieved. However, a time (a count value) corresponding to a transfer time of the synchronization pulse (i.e., the transmission delay time between the relay devices) cannot be synchronized.

Therefore, when the above-described two updates are performed by the synchronization, the transmission delay time between the relay devices is excluded from a total processing delay time of the two relay devices. Therefore, in the above-described two updates being performed, it is necessary to add the transmission delay time between the relay devices to the correction value of the correction field.

In the case where radio communication is used between the relay devices, a degree of freedom of an installation interval of the two devices is high, and the transmission delay time differs for each two devices to be installed. Therefore, unless the transmission delay time according to the installation interval of each relay device is determined, the accuracy of the correction value of the correction field cannot be maintained. Consequently, the transmission delay time must be remeasured whenever the relay device is installed, and thus installation work becomes complicated. In view of the points discussed above, the above-mentioned problems may occur.

The present invention has been made to solve such problems, and an object thereof is to provide a communication system, a time synchronization method, and radio relay devices for maintaining accuracy of a correction value of a correction field in a case where two or more radio relay devices relay communication between communication devices that perform time synchronization using a time synchronization packet.

Solution to Problem

A communication system according to a first aspect of the present invention includes:

a first radio relay device that receives a time synchronization packet including a correction value for performing time synchronization from a master device that performs the time synchronization, and transfers the time synchronization packet by radio communication; and a second radio relay device that transfers the time synchronization packet received from the first radio relay device by the radio communication to a slave device that performs the time synchronization.

In the communication system, the first radio relay device transmits to the second radio relay device a first radio frame in which a first pulse has been set, the second radio relay device detects the first pulse from the received first radio frame, and transmits to the first radio relay device a second radio frame in which a second pulse has been set according to the detection of the first pulse, the first radio relay device detects the second pulse from the received second radio frame, and either one of the first radio relay device and the second radio relay device adjusts the correction value included in the time synchronization packet using a transmission delay time between the first radio relay device and the second radio relay device calculated based on at least the setting of the first pulse and the detection of the second pulse.

A time synchronization method according to a second aspect of the present invention is the time synchronization method in a communication system, the communication system including: a first radio relay device that receives a time synchronization packet including a correction value for performing time synchronization from a master device that performs the time synchronization, and transfers the time synchronization packet by radio communication; and a second radio relay device that transfers the time synchronization packet received from the first radio relay device by the radio communication to a slave device that performs the time synchronization.

In the time synchronization method, the first radio relay device transmits to the second radio relay device a first radio frame in which a first pulse has been set, the second radio relay device detects the first pulse from the received first radio frame, and transmits to the first radio relay device a second radio frame in which a second pulse has been set according to the detection of the first pulse, the first radio relay device detects the second pulse from the received second radio frame, and either one of the first radio relay device and the second radio relay device adjusts the correction value included in the time synchronization packet using a transmission delay time between the first radio relay device and the second radio relay device calculated based on at least the setting of the first pulse and the detection of the second pulse.

A radio relay device according to a third aspect of the present invention is one of a plurality of radio relay devices that relay by radio communication a time synchronization packet including a correction value for performing time synchronization between a master device and a slave device that perform the time synchronization.

The radio relay device includes: a radio communication unit that sets a first pulse in a first radio frame, transmits the first radio frame to the other radio relay device of the plurality of radio relay devices, receives a second radio frame that is returned to the first radio frame from the other radio relay device and in which a second pulse has been set, and detects the second pulse from the second radio frame;

a measurement unit that measures a transmission delay time between the radio relay device itself and the other radio relay device based on the setting of the first pulse and the detection of the second pulse; and an adjustment unit that adjusts the correction value included in the time synchronization packet using the transmission delay time.

Advantageous Effects of Invention

According to the present invention, there can be provided a communication system, a time synchronization method, and radio relay devices for maintaining accuracy of a correction value of a correction field in a case where two or more radio relay devices relay communication between communication devices that perform time synchronization using a time synchronization packet.

DESCRIPTION OF EMBODIMENTS

Hereinafter, specific embodiments to which the present invention has been applied will be explained in detail with reference to drawings. In each drawing, the same symbols are given to the same components, and thus overlapping explanation is omitted as needed for clarity of explanation.
<Embodiment 1>

Figure 1:
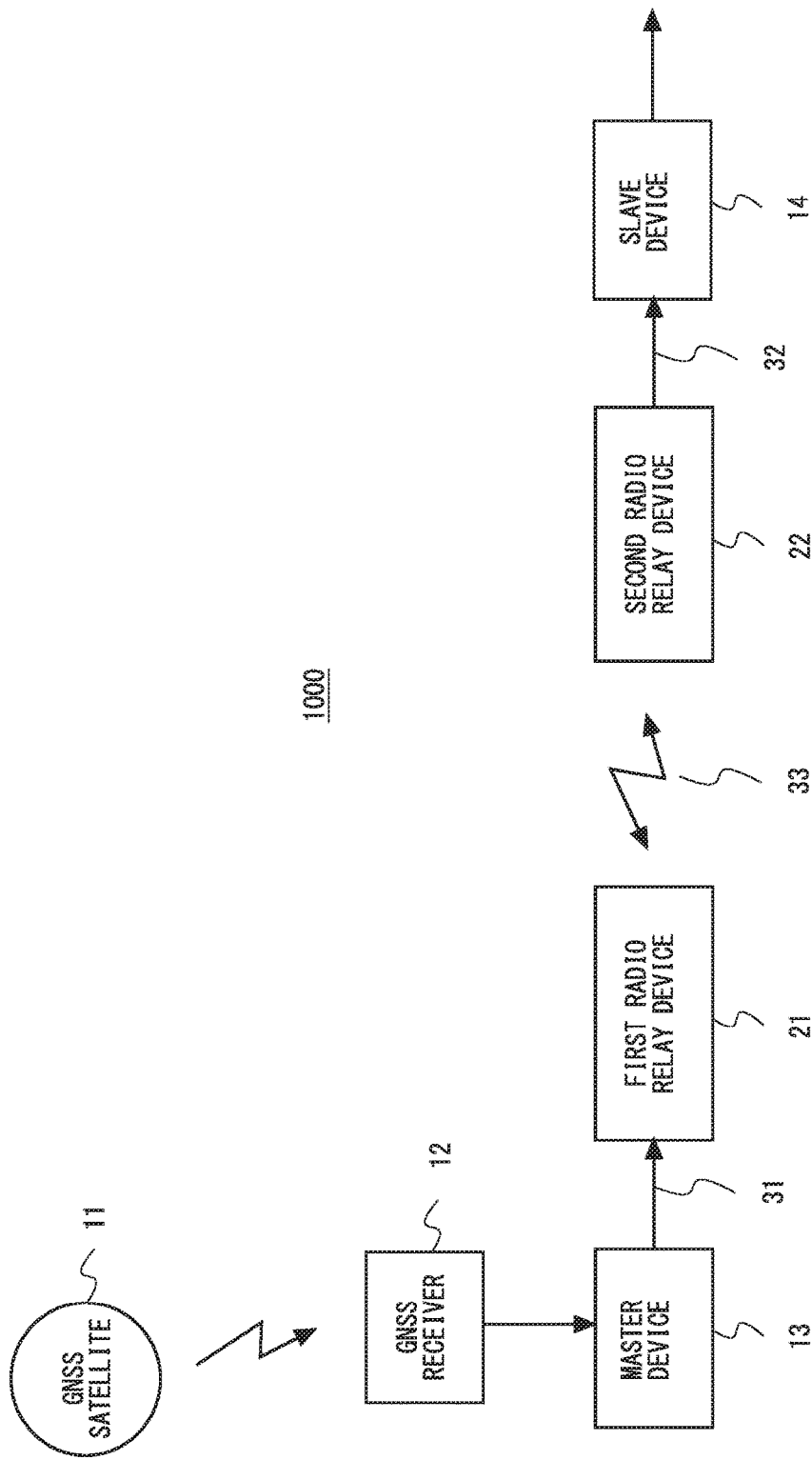
FIG. 1 is a block diagram showing an entire configuration of a communication system according to an embodiment 1 of the present invention.

FIG. 1 is a block diagram showing an entire configuration of a communication system 1000 according to an embodiment 1 of the present invention. The communication system 1000 includes: a GNSS satellite 11; a GNSS receiver 12; a master device 13; a slave device 14; a first radio relay device 21; and a second radio relay device 22. Note that the communication system 1000 according to the embodiment 1 may just include at least the master device 13, the slave device 14, the first radio relay device 21, and the second radio relay device 22.

The GNSS receiver 12 is a receiver in a satellite navigation system, and receives a navigation signal from the GNSS satellite 11 etc. Note that since the GNSS satellite 11 and the GNSS receiver 12 are well-known, detailed explanations thereof are omitted. In addition, wired transmission paths 31 and 32 are, for example, transmission paths by Ethernet (a registered trademark).

The master device 13 is a communication device compatible with a Transparent Clock function of IEEE 1588. Additionally, the master device 13 shall be a synchronization source of time, in time synchronization being performed between the master device 13 and the slave device 14. The master device 13 is connected to the first radio relay device 21 by the wired transmission path 31. The master device 13 regularly receives a time, a timing pulse, a clock, or the like from the GNSS receiver 12. Additionally, the master device 13 regularly transmits a time synchronization packet (for example, a PTP packet) to the slave device 14.

The time synchronization packet includes a correction value for performing time synchronization. The correction value is a sum of times when the time synchronization packet is retained in each relay device that relays the time synchronization packet between the master device 13 and the slave device 14. Additionally, in a case where the time synchronization packet is the PTP packet, the correction value is a value set in a correction field of an overhead in the PTP packet.

The slave device 14 is a communication device compatible with the Transparent Clock function of IEEE 1588. Additionally, the slave device 14 shall be a synchronization destination of time, in time synchronization being performed between the master device 13 and the slave device 14. The slave device 14 is connected to the second radio relay device 22 by the wired transmission path 32.

The first radio relay device 21 is a radio relay device compatible with the Transparent Clock function of IEEE 1588. The first radio relay device 21 is connected to the master device 13 by the wired transmission path 31. In addition, the first radio relay device 21 can perform radio communication with the second radio relay device 22 by a radio transmission path 33. Therefore, the first radio relay device 21 transmits the time synchronization packet received from the master device 13 through the wired transmission path 31 to the second radio relay device 22 through the radio transmission path 33. That is, the first radio relay device 21 is a relay device that transfers the received time synchronization packet to the second radio relay device 22 by radio communication.

The second radio relay device 22 is a radio relay device compatible with the Transparent Clock function of IEEE 1588. The second radio relay device 22 is connected to the slave device 14 by the wired transmission path 32. In addition, the second radio relay device 22 can perform radio communication with the first radio relay device 21 by the radio transmission path 33. Therefore, the second radio relay device 22 transmits the time synchronization packet received from the first radio relay device 21 through the radio transmission path 33 to the slave device 14 through the wired transmission path 32. That is, the second radio relay device 22 is a relay device that transfers to the slave device 14 the time synchronization packet received by radio communication.

As described above, the communication system 1000 according to the embodiment 1 goes through the two radio relay devices in the communication between the master device 13 and the slave device 14. Additionally, upon transmitting the time synchronization packet from the master device 13 to the slave device 14, the number of updates of the correction value of each radio relay device is one for each device as mentioned above. That is to say, the first radio relay device 21 subtracts a count value of an internal counter (not shown) from the correction value of the correction field at the time of the start of internal packet processing. The first radio relay device 21 then transforms the time synchronization packet including an updated correction value into a radio frame and then transmits the radio frame to the second radio relay device 22, without updating the correction value after the end of the packet processing. In addition, the second radio relay device 22 does not update the correction value at the time of start of packet processing to the time synchronization packet in the received radio frame, and adds a count value of an internal counter (not shown) to the correction value of the correction field at the time of the end of the packet processing. As described above, the first radio relay device 21 and the second radio relay device 22 are regarded as being one relay device between the master device 13 and the slave device 14, and a total processing delay time of the radio relay devices is added to the correction value.

However, in a case where only the above-described processing is performed, a transmission delay time between the radio relay devices is excluded from the total processing delay time since there is a time lag between the radio relay devices as mentioned above. Accordingly, it is necessary to add the transmission delay time to the total processing delay time. Consequently, in the embodiment 1 of the present invention, before the time synchronization packet is relayed, a transmission delay time between the first radio relay device 21 and the second radio relay device 22 is previously calculated, and the correction value is adjusted. Therefore, hereinafter, an outlines of calculation processing of the transmission delay time and adjustment of the correction value will be given.

First, the first radio relay device 21 measures an RTD (Round Trip Delay) between the first radio relay device 21 and the second radio relay device 22. For this reason, the first radio relay device 21 transmits to the second radio relay device 22 a first radio frame in which a delay measurement pulse (a first pulse) has been set. The second radio relay device 22 then returns to the first radio relay device 21 a second radio frame in which a delay measurement pulse (a second pulse) has been set. Additionally, either one of the first radio relay device 21 and the second radio relay device 22 adjusts a correction value included in a time synchronization packet using a transmission delay time between the first radio relay device 21 and the radio relay device 22 calculated based on at least the setting of the first pulse and detection of the second pulse.

Note that the above-mentioned delay measurement pulses, which are the first pulse and the second pulse, are information that can be made to have periodicity as the above-mentioned frame pulse. However, the delay measurement pulse may just be set in the first radio frame and the second radio frame that is sent back from the first radio frame at least once, respectively. Therefore, information, such as a signal or data detectable in each of the first radio relay device 21 and the second radio relay device 22 can be used for the delay measurement pulse. For example, the delay measurement pulse can also be represented by at least a 1-bit signal. Consequently, the first pulse and the second pulse may simply be represented as a first signal and a second signal, first data and second data, or first information and second information, etc.

Figure 2:
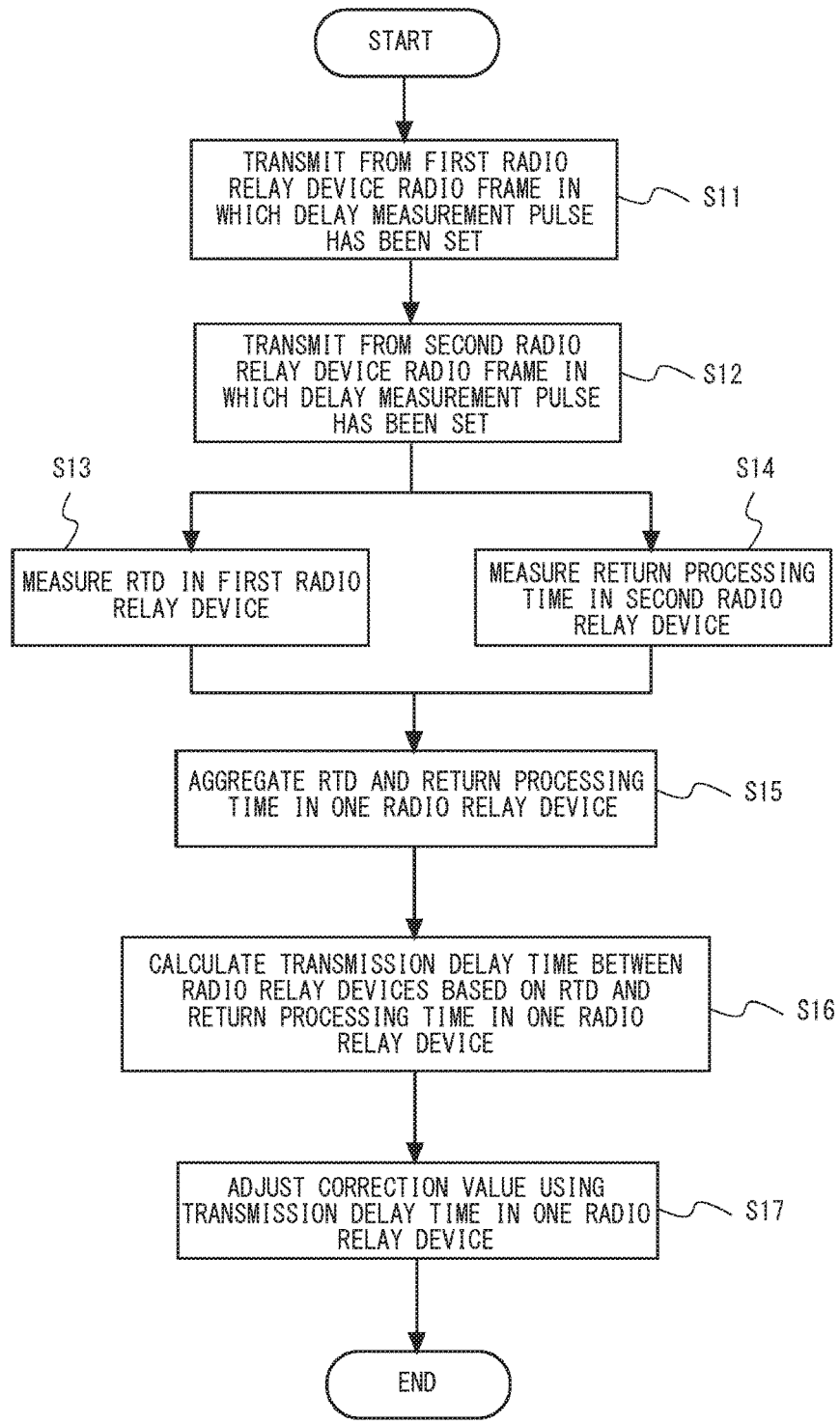
FIG. 2 is a flow chart showing a flow of calculation processing of a transmission delay time and adjustment processing of a correction value of a time synchronization packet according to the embodiment 1 of the present invention.

FIG. 2 is a flow chart showing a flow of calculation of the transmission delay time and adjustment processing of the correction value of the time synchronization packet according to the embodiment 1 of the present invention. First, the first radio relay device 21 sets the delay measurement pulse (the first pulse) in the first radio frame, and transmits the first radio frame to the second radio relay device 22 (S11). Note that "setting" the delay measurement pulse to the radio frame can be rephrased as "multiplexing" it. The second radio relay device 22 then receives the first radio frame, and detects the first pulse from the first radio frame. Subsequently, the second radio relay device 22 sets the delay measurement pulse (the second pulse) in the second radio frame according to the detection of the first pulse, and transmits the second radio frame to the first radio relay device 21 (S12). That is, in a case where the second radio relay device 22 receives from the first radio relay device 21 the first radio frame in which the first pulse has been set, the second radio relay device 22 sends back the second radio frame in which the second pulse has been set.

After that, the first radio relay device 21 detects the second pulse from the second radio frame. That is, in a case where the second radio frame in which the second pulse has been set is returned from the second radio relay device 22 to the first radio frame, the first radio relay device 21 detects the delay measurement pulse from the second radio frame. The first radio relay device 21 then measures the RTD (a first time) between the first radio relay device 21 itself and the second radio relay device 22 based on the setting of the first pulse and the detection of the second pulse (S13).

Meanwhile, the second radio relay device 22 measures a return processing time dt (a second time) of the second radio frame with respect to the first radio frame based on the detection of the first pulse and the setting of the second pulse (S14).

The first radio relay device 21 and the second radio relay device 22 aggregate the RTD and the return processing time dt in the one relay device (S15). For example, in a case where the first radio relay device 21 is the "one relay device", the second radio relay device 22 notifies the first radio relay device 21 of the return processing time dt. In a case where the second radio relay device 22 is the "one relay device", the first radio relay device 21 notifies the second radio relay device 22 of the RTD. Thus, the "one relay device" holds both the RTD and the return processing time dt.

Additionally, the one relay device calculates the transmission delay time between the first radio relay device 21 and the second radio relay device 22 based on the RTD and the return processing time dt (S16). As a calculation method of the transmission delay time, for example, the following Expression (1) is included.

$$\text{Transmission delay time}=(RTD-dt)/2 \qquad \text{Expression (1)}$$

After that, the one relay device adjusts the correction value using the transmission delay time (S17). Here, "adjusting the correction value" shall mean performing correction on timing to clear the count value of the counter of the one relay device, or shall include adding the transmission delay time to the correction value, etc.

As described above, in the embodiment 1, by performing the transmission and reception of the radio frames with the pulses for measuring the transmission delay time between the radio relay devices, whereby the transmission delay time according to an installation interval and an installation condition between the radio relay devices can be exactly calculated. Therefore, it becomes unnecessary to calculate the processing delay time for each radio relay device. Additionally, the correction value is adjusted (clear timing of the counter is corrected or the correction value itself is modified) using the transmission delay time corresponding to an initial time lag between the radio relay devices by two updates in which the correction value is modified at the time of the start of the packet processing of one end of the first radio relay device and in which the correction value is modified at the time of the end of the packet processing of the other end of the second radio relay device, whereby accuracy of the correction value can be maintained. Therefore, time synchronization between the master device 13 and the slave device 14 through the plurality of radio relay devices can be exactly performed.

EXAMPLE 1

Subsequently, an example 1, which is a specific example of the embodiment 1 of the present invention, will be explained. The example 1 shows a case where the first radio relay device 21 is the "one relay device", and where "adjusting a correction value" means correction on timing to clear a count value. Particularly, the example 1 shows a case where clear timing is delayed among corrections on the timing to clear the count value. Therefore, synchronization of the counter values between the radio relay devices can be performed in the example 1.

Figure 3:
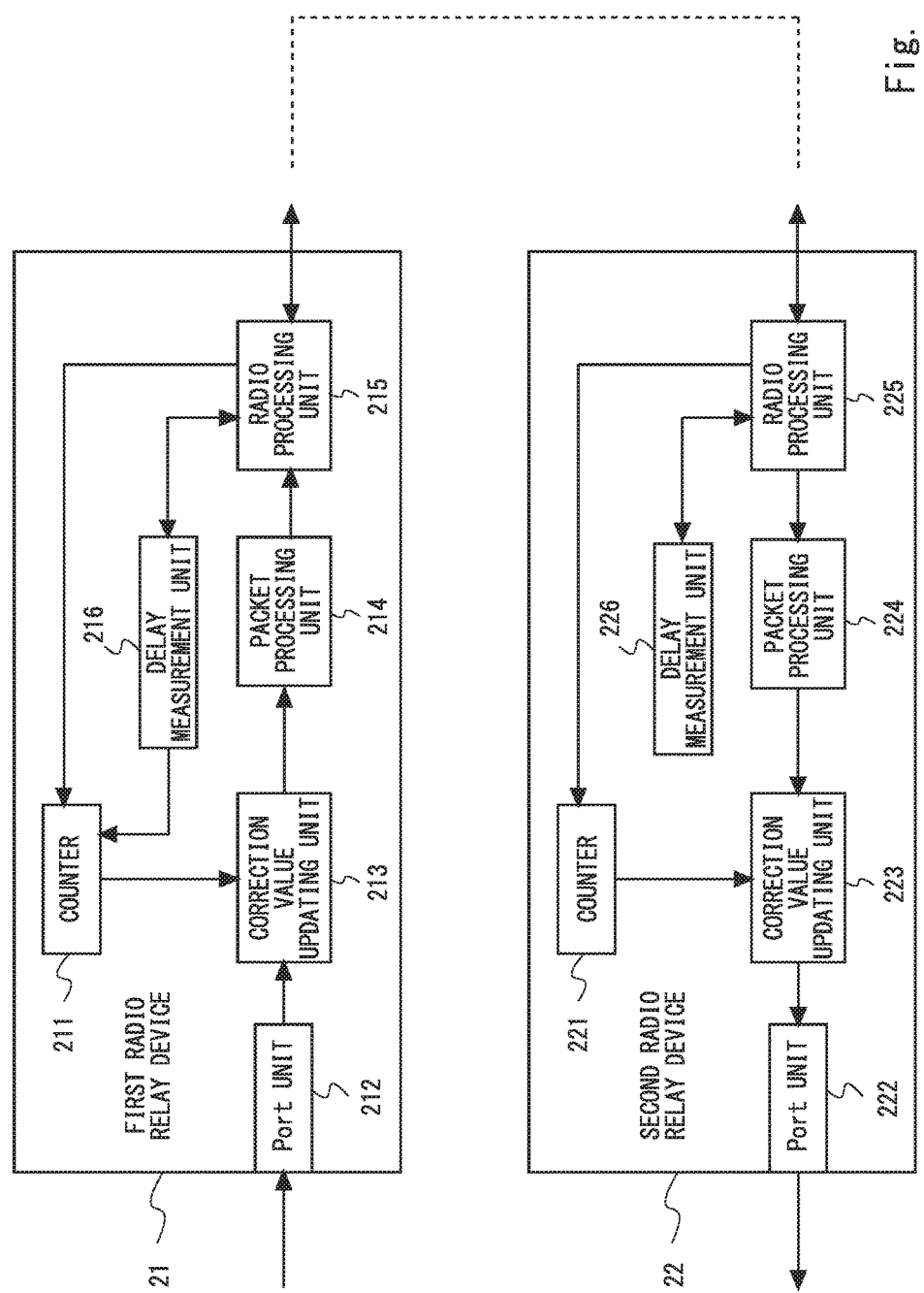
FIG. 3 is a block diagram showing configurations of two radio relay devices that perform radio communication according to an example 1 of the present invention.

FIG. 3 is a block diagram showing configurations of two radio relay devices that perform radio communication according to the example 1 of the present invention. The first radio relay device 21 includes: a counter 211; a Port unit 212; a correction value updating unit 213; a packet processing unit 214; a radio processing unit 215; and a delay measurement unit 216.

The counter 211 adds 1 to a count value one by one in accordance with a count interval adjusted according to detection of a frame pulse (mentioned later) included in a radio frame, and clears the count value to be 0 in a case where it reaches an upper-limit value. Note that an interval (the upper-limit value) at which the count value is cleared shall be a sufficiently longer time compared with a total processing delay time of the two radio relay devices in order to avoid the count value being cleared during radio communication. In addition, the counter 211 may adjust the clear interval of the count value according to the detection of the frame pulse.

The Port unit 212 receives various types of data, such as a time synchronization packet transmitted from the master device 13 through the wired transmission path 31, and outputs it to the correction value updating unit 213.

The correction value updating unit 213 acquires from the counter 211 a count value at the time of receiving an input of the time synchronization packet from the Port unit 212, extracts a correction value from an overhead of the time synchronization packet, and subtracts the count value from the correction value. The correction value updating unit 213 then replaces the correction value in the overhead from which the count value has not been subtracted with a correction value from which the count value has been subtracted. The correction value updating unit 213 then outputs to the packet processing unit 214 the time synchronization packet including the correction value from which the count value has been subtracted.

The packet processing unit 214 performs packet processing with regard to the time synchronization packet received from the correction value updating unit 213. Here, packet processing means various types of processing with regard to a payload and the overhead of the time synchronization packet in the first radio relay device 21. For example, the packet processing is rewriting processing etc. Therefore, the packet processing fluctuates according to each set value of the payload and the overhead of the time synchronization packet. Additionally, the packet processing unit 214 outputs to the radio processing unit 215 the time synchronization packet in which the packet processing has been performed.

The radio processing unit 215 generates as a radio frame the various types of data to be transmitted to the second radio relay device 22. The radio processing unit 215 then transmits the generated radio frame to the second radio relay device 22 through the radio transmission path 33. Upon generating the radio frame, the radio processing unit 215 sets to the overhead of the radio frame the frame pulse for performing synchronization of the count intervals. Here, the frame pulse means a synchronization pulse for synchronizing the count intervals of the first counter 211 of the first radio relay device 21 and the second counter 221 of the second radio relay device 22. In addition, in a case where the radio processing unit 215 calculates the transmission delay time between the first radio relay device 21 and the second radio relay device 22, the radio processing unit 215 sets a delay measurement pulse for measuring an RTD to the overhead of the radio frame. Further, in a case of synchronizing clear timing of the counter 211 and the counter 221, the radio processing unit 215 sets a clear flag in the overhead of the radio frame. Note that the radio processing unit 215 sets the delay measurement pulse and the clear flag according to instructions from the delay measurement unit 216.

In addition, the radio processing unit 215 receives the radio frame from the second radio relay device 22 through the radio transmission path 33, and performs analysis etc. of the received radio frame. For example, the radio processing unit 215 detects the frame pulse, the delay measurement pulse, and a return processing time dt from the overhead of the received radio frame. In a case where the frame pulse is detected, the radio processing unit 215 notifies the counter 211 of the detection, and makes it adjust the count interval of the counter 211. In addition, in a case where the delay measurement pulse and the return processing time dt are detected, the radio processing unit 215 notifies the delay measurement unit 216 of the detection.

Figure 4:
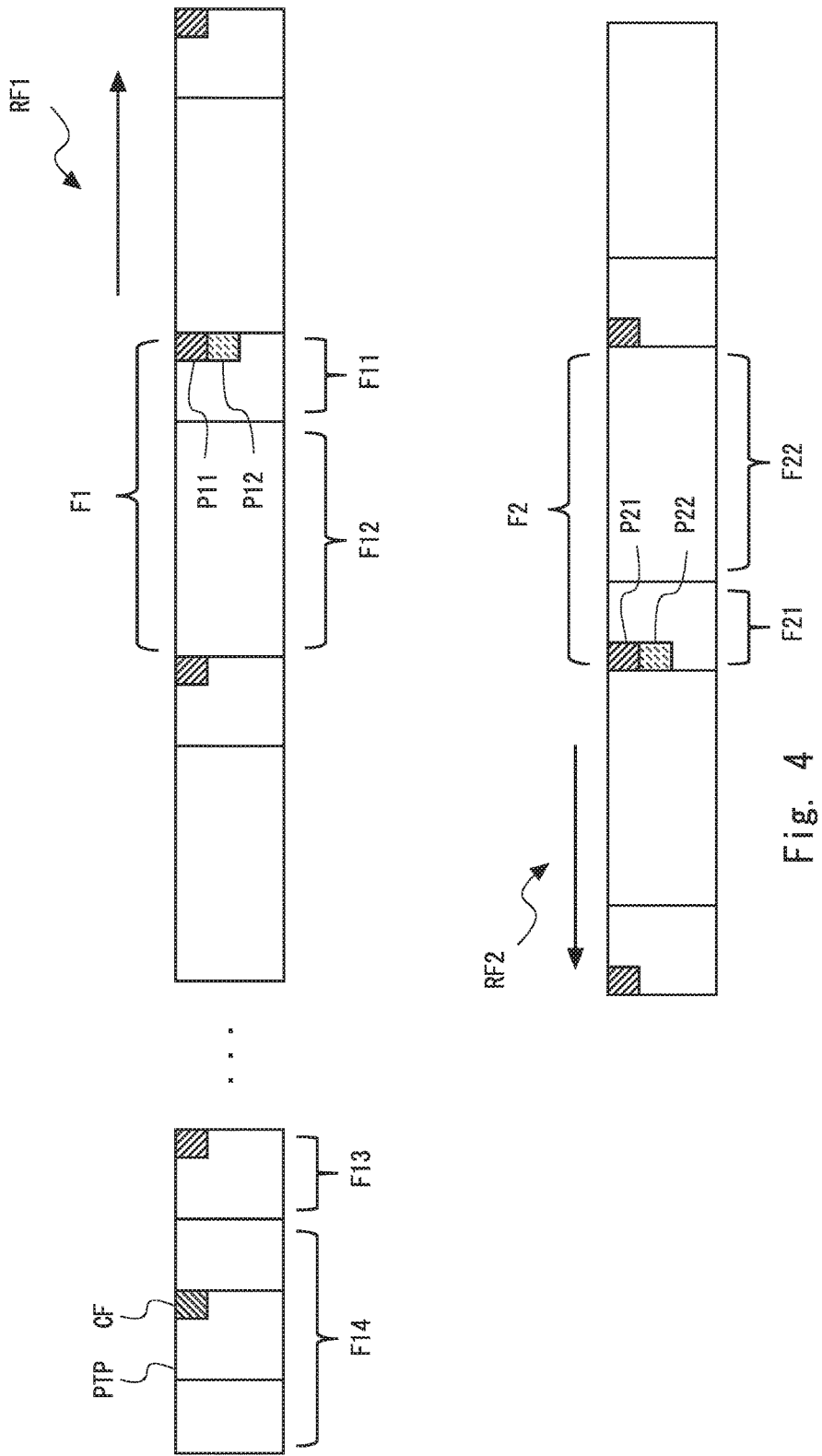
FIG. 4 is a diagram for explaining concepts of synchronization pulses and delay measurement pulses included in radio frames according to the embodiment 1 of the present invention.

FIG. 4 is a diagram for explaining concepts of synchronization pulses and delay measurement pulses included in radio frames according to the embodiment 1 of the present invention. A radio frame group RF1 is a set of radio frames transmitted in a direction toward the second radio relay device 22 from the first radio relay device 21. A radio frame F1 belonging to the radio frame group RF1 includes an overhead F11 and a payload F12. For example, the radio frame F1 corresponds to the first radio frame. Additionally, in the overhead F11, a frame pulse P11 and a delay measurement pulse P12 are multiplexed. Here, the delay measurement pulse P12 corresponds to the above-mentioned first pulse. Note that the frame pulse P11 is multiplexed to each overhead of each radio frame other than the radio frame F1, respectively.

In addition, a radio frame group RF2 is a set of radio frames transmitted in a direction toward the first radio relay device 21 from the second radio relay device 22. A radio frame F2 belonging to the radio frame group RF2 includes an overhead F21 and a payload F22. For example, the radio frame F2 corresponds to the second radio frame. Additionally, in the overhead F21, a frame pulse P21 and a delay measurement pulse P22 are multiplexed. Here, the delay measurement pulse P22 corresponds to the above-mentioned second pulse. Note that the frame pulse P21 is, similarly to the frame pulse P11, multiplexed to each overhead of each radio frame other than the radio frame F2, respectively.

Note that after the Port unit 212 receives the time synchronization packet, the correction value updating unit 213 updates the correction value, and the packet processing unit 214 performs predetermined packet processing, the radio processing unit 215 includes the time synchronization packet in the radio frame. For example, the radio processing unit 215 includes a PTP packet PTP in a payload F14 of a radio frame after a few frames from the radio frame F1. Additionally, a correction value CF is included in the PTP packet. Note that a frame pulse may be included in an overhead F13 at this time.

Now returning to FIG. 3, the explanation of the first radio relay device 21 will be continued. The delay measurement unit 216 instructs the radio processing unit 215 to set the delay measurement pulse (the first pulse) in a case where the delay measurement unit 216 calculates the transmission delay time between the first radio relay device 21 and the second radio relay device 22. The delay measurement unit 216 then acquires from the counter 211 a count value at the time of instructing the radio processing unit 215 to set the delay measurement pulse, and holds it.

In addition, in a case where the delay measurement unit 216 receives from the radio processing unit 215 notification that it has detected the delay measurement pulse (the second pulse), the delay measurement unit 216 acquires a count value at this time from the counter 211, and holds it. The delay measurement unit 216 then measures as the RTD a difference at the time of the setting of the first pulse and the detection of the second pulse.

In addition, in a case of where the delay measurement unit 216 receives notification of the return processing time dt from the radio processing unit 215, the delay measurement unit 216 calculates a transmission delay time by the above-described Expression (1). The delay measurement unit 216 then performs correction on the timing to clear the count value of the counter 211. In the example 1, the delay measurement unit 216 delays the timing to clear the count value of the counter 211 by the calculated transmission delay time. For example, the delay measurement unit 216 suppresses clearing at the clear timing of the count value of the counter 211, and instructs the radio processing unit 215 to transmit a radio frame including a clear flag to the second radio relay device 22. The delay measurement unit 216 then clears the count value of the counter 211 so that it is 0 after elapse of the transmission delay time from the instruction to transmit the above-described clear flag.

Subsequently, the second radio relay device 22 includes: the counter 221; a Port unit 222; a correction value updating unit 223; a packet processing unit 224; a radio processing unit 225; and a delay measurement unit 226.

The counter 221, similarly to the counter 211, adds 1 to a count value one by one in accordance with a count interval adjusted according to detection of a frame pulse, and clears the count value so that it is 0 in a case where it reaches an upper-limit value. In addition, the counter 221 clears the count value so that it is 0 also in a case where it receives notification of detection of a clear flag from the radio processing unit 225.

The radio processing unit 225 receives a radio frame from the first radio relay device 21 through the radio transmission path 33, and performs analysis etc. of the received radio frame. For example, the radio processing unit 225 detects a frame pulse, a delay measurement pulse, and a clear flag from an overhead of the received radio frame. In a case where the radio processing unit 225 detects the frame pulse, the radio processing unit 225 notifies the counter 221 of the detection, and makes it adjust the count interval of the counter 221. Particularly, since the frame pulse is always included in the radio frame, the count intervals of the counter 211 and the counter 221 are in synchronization with each other.

In addition, in a case where the radio processing unit 225 detects the delay measurement pulse, the radio processing unit 225 notifies the delay measurement unit 226 of the detection. Further, in a case where the radio processing unit 225 detects the clear flag, the radio processing unit 225 makes the counter 221 clear the count value thereof.

In addition, the radio processing unit 225 outputs to the packet processing unit 224 a time synchronization packet etc. extracted from a payload of the radio frame.

In addition, the radio processing unit 225 sets the delay measurement pulse and a return processing time dt to an overhead of the radio frame according to instructions from the delay measurement unit 226.

Note that in another aspect, the radio processing units 215 and 225 can be said to be ones that perform modulation processing from a BB signal to an RF signal, and demodulation processing from the RF signal to the BB signal.

In a case where the delay measurement unit 226 receives from the radio processing unit 225 notification that it has detected the delay measurement pulse (the first pulse), the delay measurement unit 226 acquires a count value at this time from the counter 221, and holds it. The delay measurement unit 226 then instructs the radio processing unit 225 to set the delay measurement pulse (a second pulse) according to the notification of that the first pulse has been detected. The delay measurement unit 226 then acquires from the counter 221 a count value at the time of instructing the radio processing unit 215 to set the delay measurement pulse, and holds it. The delay measurement unit 226 then measures as the return processing time dt a difference at the time of the detection of the first pulse and the setting of the second pulse. After that, the delay measurement unit 226 outputs the measured return processing time dt to the radio processing unit 225, and instructs it to notify the first radio relay device 21 about it.

Note that the return processing time dt is a time required from the detection of the first pulse to the setting of the second pulse, and that the time can be said to be independent of a content of the payload of the radio frame. Therefore, once the count intervals of the counter 211 and the counter 221 can be synchronized, the return processing time dt can be said to be independent of an installation interval of the first radio relay device 21 and the second radio relay device 22, and to be constant. Consequently, once the return processing time dt in the second radio relay device 22 is measured, it can be said that measurement of the return processing time dt is unnecessary, even if an installation position of the second radio relay device 22 is changed afterwards. In that case, it also becomes unnecessary to notify the first radio relay device 21 of the return processing time dt. Further, in the second radio relay device 22, detection timing of the first pulse and setting timing of the second pulse are previously prescribed, and thereby measurement of the return processing time dt itself can also be omitted.

The packet processing unit 224 performs packet processing with regard to the time synchronization packet received from the radio processing unit 225. The packet processing unit 224 then outputs to the correction value updating unit 223 a time synchronization packet in which the packet processing has been performed. The correction value updating unit 223 acquires from the counter 221 a count value at the time it receives an input of the time synchronization packet from the packet processing unit 224, extracts a correction value from an overhead of the time synchronization packet, and adds the count value to the correction value. The correction value updating unit 223 then replaces the correction value in the overhead to which the count value has not been added with a correction value to which the count value has been added. The correction value updating unit 223 then outputs to the Port unit 222 the time synchronization packet including the correction value to which the count value has been added.

The Port unit 222 transmits the time synchronization packet received from the correction value updating unit 223 to the slave device 14 through the wired transmission path 32.

Figure 5:
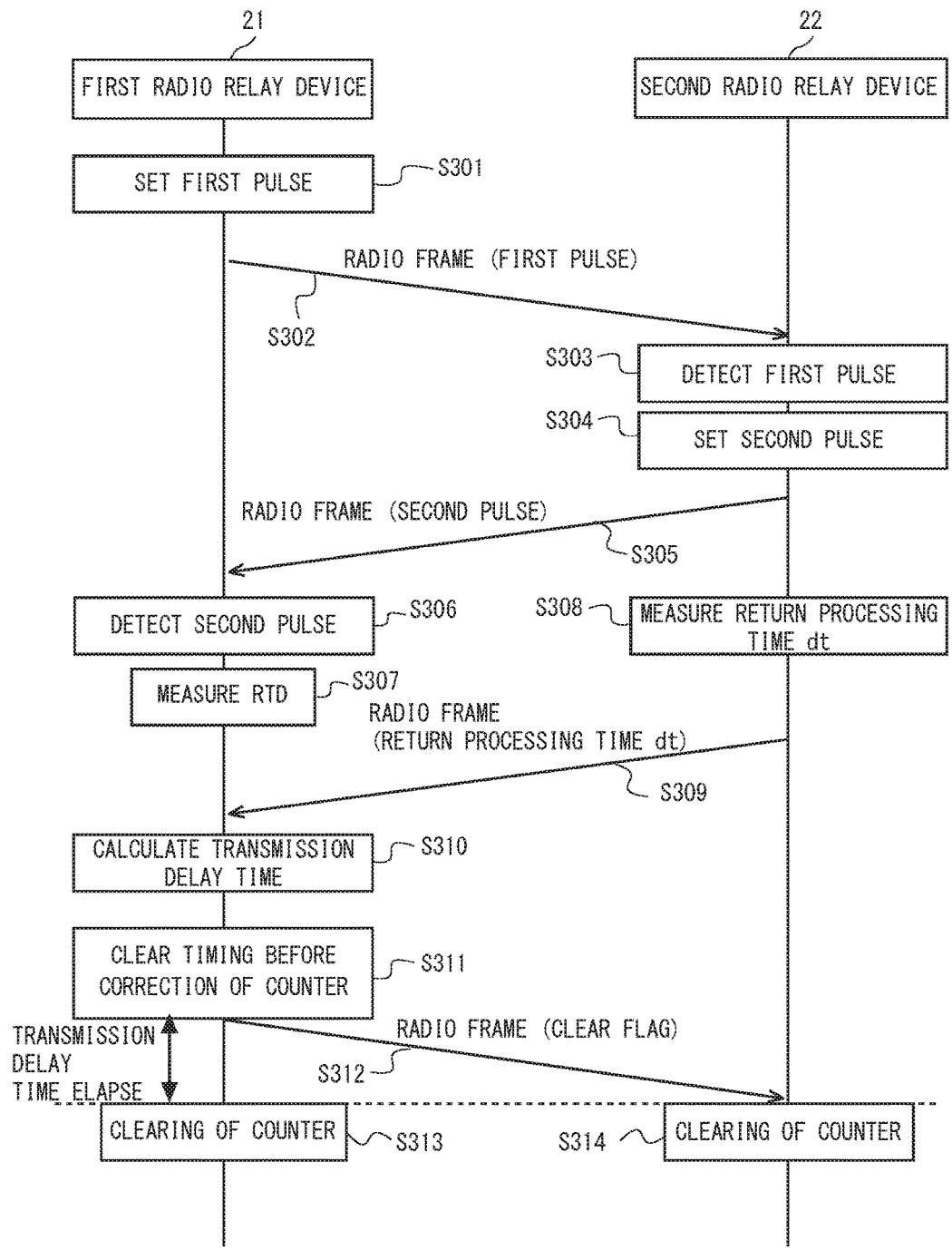
FIG. 5 is a sequence diagram showing a flow of calculation processing of a transmission delay time and adjustment processing of a correction value according to the example 1 of the present invention.

FIG. 5 is a sequence diagram showing a flow of calculation processing of the transmission delay time and adjustment processing of the correction value according to the example 1 of the present invention. First, the first radio relay device 21 sets a first pulse (S301). For example, in a case shown in FIG. 4, the radio processing unit 215 sets the delay measurement pulse P12 in the overhead F11 of the radio frame F1 according to the instruction of the delay measurement unit 216.

Next, the first radio relay device 21 transmits to the second radio relay device 22 a radio frame in which the first pulse has been set (S302). The second radio relay device 22 then detects the first pulse from the received radio frame (S303). For example, in the case shown in FIG. 4, the radio processing unit 225 detects the delay measurement pulse P12 from the overhead F11 of the radio frame F1, and notifies the delay measurement unit 226 of the detection.

The second radio relay device 22 sets a second pulse according to the detection of the first pulse (S304). For example, in the case shown in FIG. 4, the radio processing unit 225 sets the delay measurement pulse P22 in the overhead F21 of the radio frame F2 according to the instruction of the delay measurement unit 226.

Additionally, the second radio relay device 22 transmits to the first radio relay device 21 a radio frame in which the second pulse has been set (S305). The first radio relay device 21 then detects the second pulse from the received radio frame (S306). For example, in the case shown FIG. 4, the radio processing unit 215 detects the delay measurement pulse P22 from the overhead F21 of the radio frame F2, and notifies the delay measurement unit 216 of the detection.

After that, the first radio relay device 21 measures an RTD (S307). That is, the delay measurement unit 216 measures as the RTD a time from the setting of the delay measurement pulse P12 in the overhead F11 of the radio frame F1 to the detection of the delay measurement pulse P22 from the overhead F21 of the radio frame F2.

In addition, in parallel with steps S306 and S307, the second radio relay device 22 measures a return processing time dt (S308). That is, the delay measurement unit 226 measures as the return processing time dt a time from the detection of the delay measurement pulse P12 from the overhead F11 of the radio frame F1 to the setting of the delay measurement pulse P22 in the overhead F21 of the radio frame F2. Additionally, the second radio relay device 22 transmits to the first radio relay device 21 a radio frame including the return processing time dt (S309). Thus, the RTD and the return processing time dt are aggregated in the first radio relay device 21.

Additionally, the first radio relay device 21 calculates a transmission delay time using the return processing time dt included in the received radio frame, and the RTD measured by the first radio relay device 21 itself (S310).

After that, when clear timing of the counter 211 before correction is reached (S311), the first radio relay device 21 suppresses clearing of a count value, and transmits a radio frame including a clear flag to the second radio relay device 22 (S312). The first radio relay device 21 then clears the count value of the counter 211 so that it is 0 after elapse of the transmission delay time from step S311 (S313). In addition, the second radio relay device 22 clears the count value of the counter 221 so that it is 0 at the timing to detect the clear flag from the received radio frame (S314). In the manner as described above, the clear timings of the count values of the counter 211 and the counter 221 are synchronized with each other.

Therefore, afterwards the count value of the counter 211 is subtracted from the correction value at the time of the start of packet processing in the first radio relay device 21, the count value of the counter 221 is added to the correction value at the time of the end of packet processing in the second radio relay device 22, and thereby the correction value can be changed into a value to which the transmission delay time between the first radio relay device 21 and the second radio relay device 22 has been added.

Figure 6:
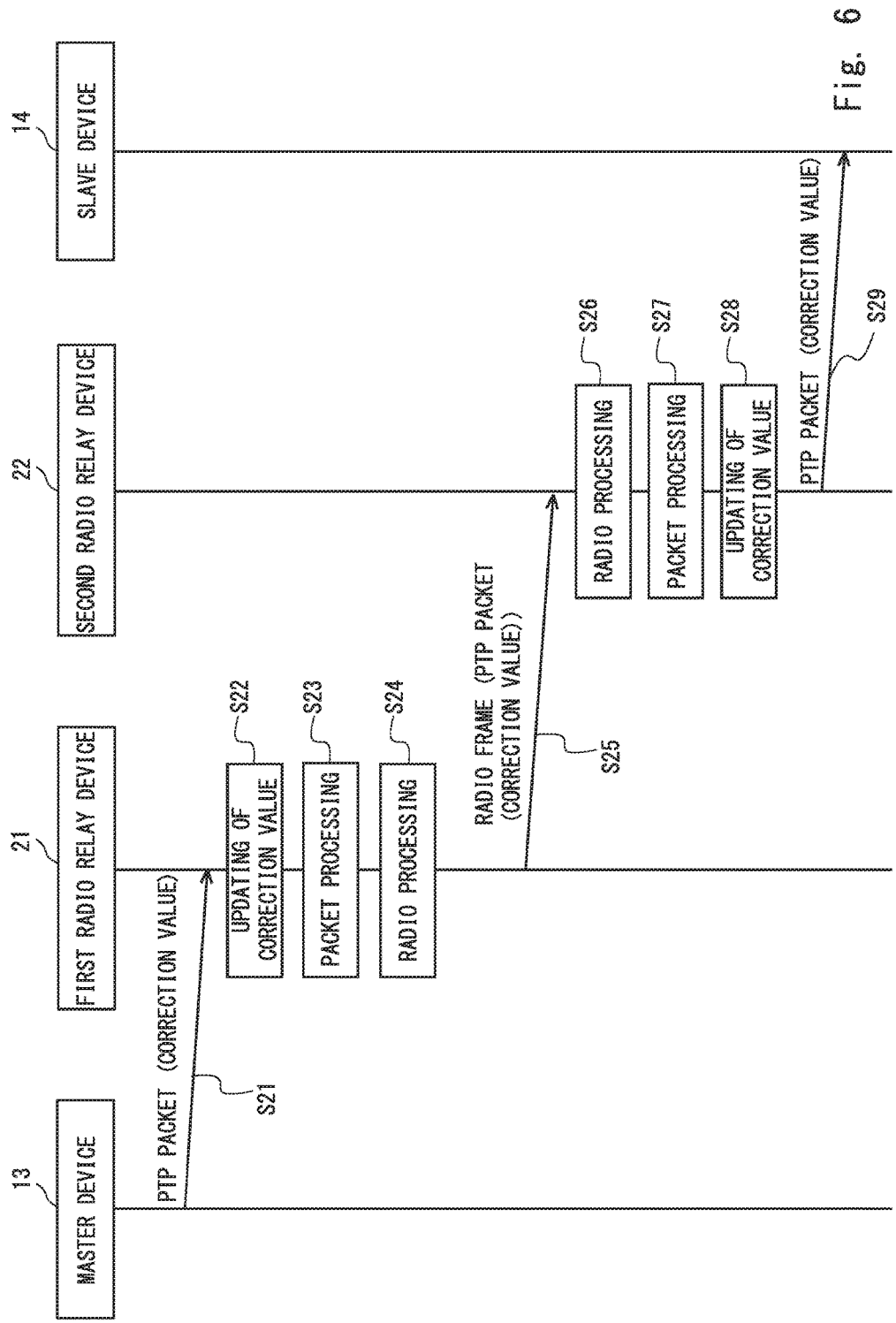
FIG. 6 is a sequence diagram showing a flow of update processing of a correction field at the time of relay of a time synchronization packet according to the embodiment 1 of the present invention.

FIG. 6 is a sequence diagram showing a flow of update processing of a correction field at the time of the relay of the time synchronization packet according to the example 1 of the present invention. Note that processing shown in FIG. 5 shall be completed before the start of the processing shown in FIG. 6, and that the count values of the counter 211 and the counter 221 shall be in synchronization with each other. In addition, FIG. 6 in which a time synchronization packet is set as a PTP packet will be explained. First, the master device 13 transmits the PTP packet addressed to the slave device 14 to the first radio relay device 21 through the wired transmission path 31 (S21). At this time, a correction value is included in the PTP packet as mentioned above.

Next, the first radio relay device 21 receives the PTP packet, and updates the correction value in the received PTP packet (S22). Specifically, the correction value updating unit 213 subtracts the count value of the counter 211 from the correction value, and multiplexes to the PTP packet a correction value from which the count value has been subtracted. That is to say, in step S22, the first radio relay device 21 subtracts from the correction value the count value at the time of the start of packet processing.

The first radio relay device 21 then performs packet processing with regard to the PTP packet (S23).

Subsequently, the first radio relay device 21 performs radio processing of the PTP packet for which the packet processing has been performed (S24). For example, in the case shown in FIG. 4, the radio processing unit 215 includes the PTP packet in the payload F14 of the radio frame. The first radio relay device 21 then performs radio transmission of a radio frame including the PTP packet to the second radio relay device 22 through the radio transmission path 33 (S25).

Subsequently, the second radio relay device 22 receives the radio frame, and performs radio processing in which the PTP packet is extracted from the received radio frame (S26). Subsequently, the second radio relay device 22 performs packet processing of the extracted PTP packet (S27).

The second radio relay device 22 then updates the correction value in the PTP packet for which the packet processing has been performed (S28). Specifically, the second radio relay device 22 adds the count value of the counter 221 to the correction value, and multiplexes to the PTP packet a correction value to which the count value has been added. That is to say, in step S28, the second radio relay device 22 adds to the correction value the count value at the time of the end of the packet processing.

After that, the second radio relay device 22 transmits the PTP packet including an updated correction value to the slave device 14 through the wired transmission path 32 (S29). Thus, the slave device 14 can perform time synchronization with the master device 13 using the correction value included in the received PTP packet.

EXAMPLE 2

Subsequently, an example 2, which is a specific example of the embodiment 1 of the present invention, will be explained. Differently from the example 1, the example 2 shows a case where a count value as a correction on timing to clear a count value is corrected.

Differently from the example 1, the first radio relay device 21 according to the example 2 performs a correction on timing by modifying the count value using the transmission delay time at a timing at which the delay measurement unit 216 clears the count value of the counter 211. Specifically, the delay measurement unit 216 according to the example 2 modifies the count value to a value shown in the following Expression (2).

$$Tmax-((RTD-dt)/2) \qquad \text{Expression (2)}$$

In other words, when the count value reaches an upper-limit value (Tmax) (for example, the timing of step S311 shown in FIG. 5), the first radio relay device 21 sets the count value to be a value from which the transmission delay time has been subtracted instead of setting it to be 0. After that, similarly to step S312 shown in FIG. 5, the first radio relay device 21 then transmits a radio frame including a clear flag to the second radio relay device 22. Therefore, since the count value of the counter 211 reaches the upper-limit value (Tmax) after elapse of the transmission delay time from step S311, the first radio relay device 21 clears the count value to be 0 as usual. Additionally, simultaneously, after the elapse of the transmission delay time from step S311, the second radio relay device 22 detects the clear flag from the received radio frame, and thus clears the count value of the counter 221 so that it is 0 similarly to step S314 shown in FIG. 5. As described above, the counter 211 and the counter 221 can be synchronized with each other also in the example 2. In the example 2, in contrast to the example 1, the first radio relay device 21 need not measure the elapse of the transmission delay time after step S312, and the count value of the counter 211 reaches the upper-limit value (Tmax) after the elapse of the transmission delay time as a result of the usual counting-up. That is, the example 2 can simplify adjustment processing itself compared with the example 1.

EXAMPLE 3

Subsequently, an example 3, which is a specific example of the embodiment 1 of the present invention, will be explained. Differently from the example 1, the example 3 shows a case where "adjusting a correction value" means adding a transmission delay time to the correction value.

Figure 7:
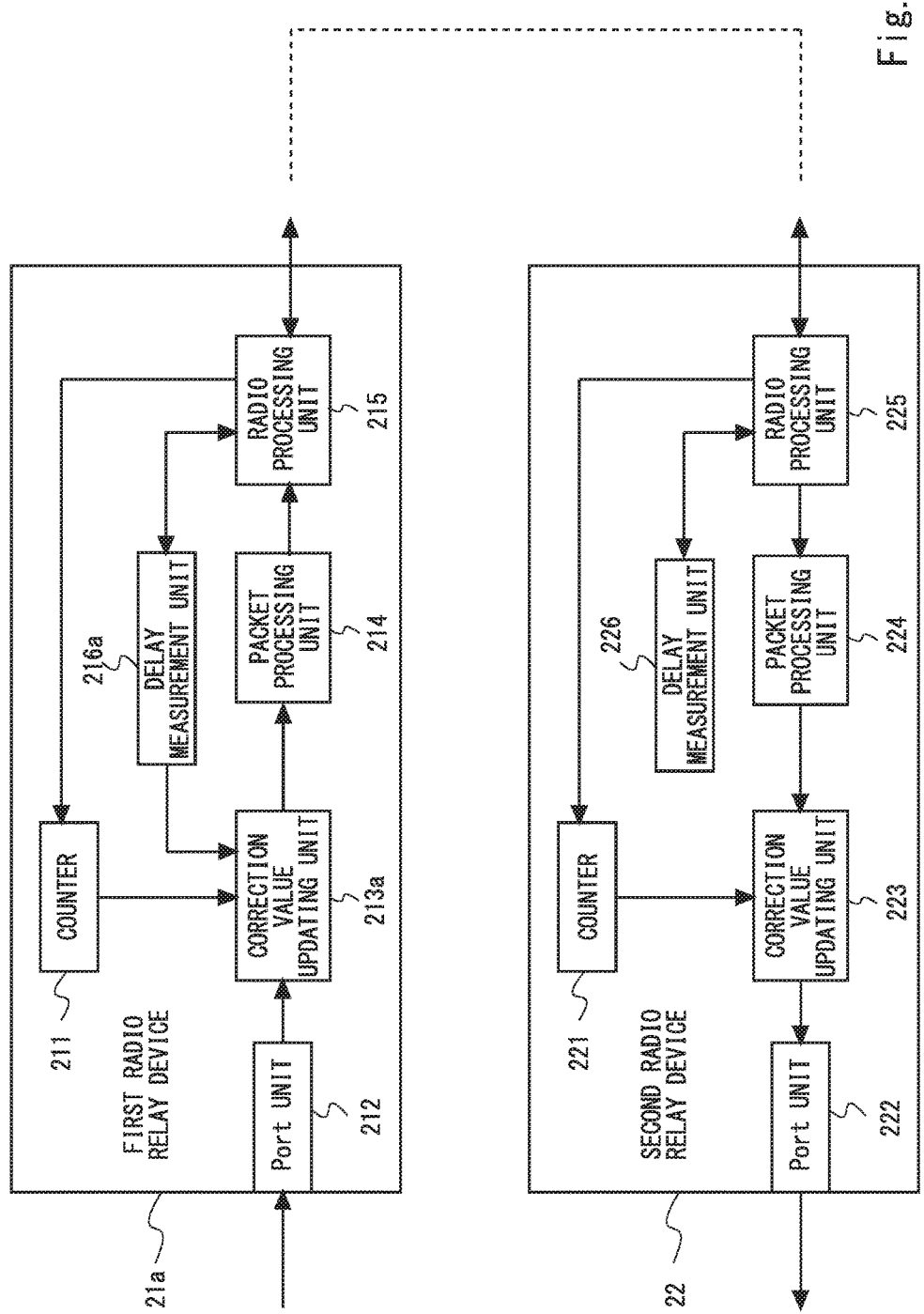
FIG. 7 is a block diagram showing configurations of two radio relay devices that perform radio communication according to an example of the present invention.

FIG. 7 is a block diagram showing configurations of two radio relay devices that perform radio communication according to the example 3 of the present invention. Note that the second radio relay device 22 is the same as that shown in FIG. 3 of the example 1. In a first radio relay device 21a, different from the first radio relay device 21 of FIG. 3, the correction value updating unit 213 and the delay measurement unit 216 are replaced with a correction value updating unit 213a and a delay measurement unit 216a. Since the other configurations are the same as those in the example 1, explanations thereof are omitted.

After calculating a transmission delay time, the delay measurement unit 216a outputs the transmission delay time to the correction value updating unit 213a instead of suppressing clearing of the counter 211. The correction value updating unit 213a then adjusts a correction value by adding to the correction value the transmission delay time received from the delay measurement unit 216a. Therefore, in step S22 of FIG. 6, the correction value updating unit 213a subtracts the count value of the counter 211 from the correction value, and also adds the transmission delay time to the correction value.

As described above, in the example 3, in contrast to the examples 1 and 2, adjustment of clear timing becomes unnecessary, and thus the transmission delay time can be immediately reflected.

EXAMPLE 4

Subsequently, an example 4, which is a specific example of the embodiment 1 of the present invention, will be explained. The example 4 shows a case where the second radio relay device 22 is the "one relay device", and where "adjusting a correction value" means correction on timing to clear a count value. Particularly, the example 4 shows a case where the count value as the correction on the timing to clear the count value is corrected.

Figure 8:
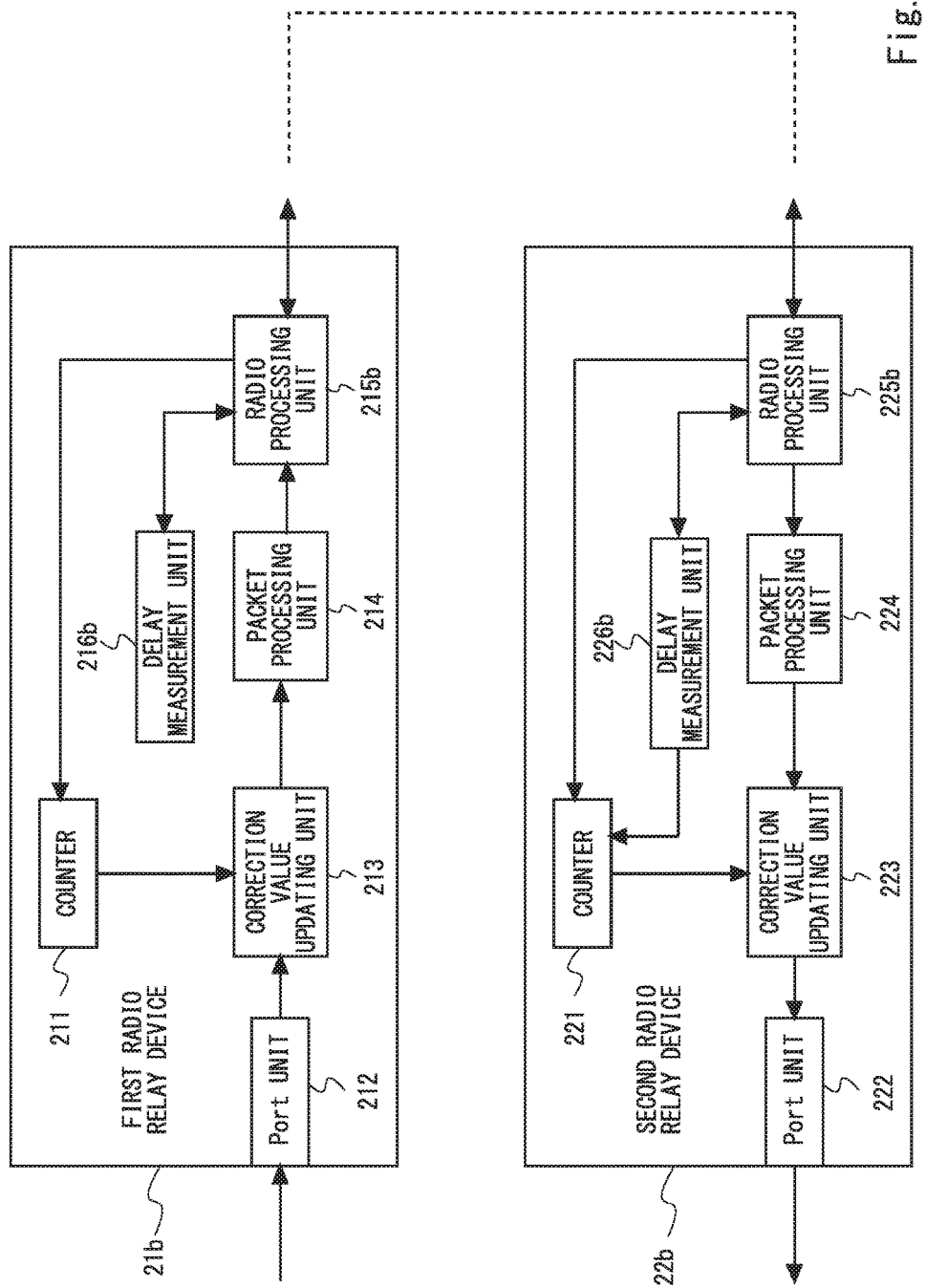
FIG. 8 is a block diagram showing configurations of two radio relay devices that perform radio communication according to an example 4 of the present invention.

FIG. 8 is a block diagram showing configurations of two radio relay devices that perform radio communication according to the example 4 of the present invention. In a first radio relay device 21b, different from the first radio relay device 21 shown in FIG. 3, the radio processing unit 215 and the delay measurement unit 216 are replaced with a radio processing unit 215b and a delay measurement unit 216b. Since the other configurations are the same as those in the example 1, explanations thereof are omitted.

The processing of delay measurement unit 216b is similar to the processing of the delay measurement unit 216 until processing to measure an RTD. The delay measurement unit 216b outputs the measured RTD to the radio processing unit 215b, and instructs it to notify a second radio relay device 22b about this output. In addition, the radio processing unit 215b sets a delay measurement pulse, the RTD, and a clear flag according to an instruction from the delay measurement unit 216b, and transmits them to the second radio relay device 22b. Particularly, the radio processing unit 215b transmits to the second radio relay device 22b a radio frame in which the clear flag has been set, after a count value of the counter 211 is cleared after the transmission of the RTD.

In the second radio relay device 22b, different from the second radio relay device 22 of FIG. 3, the radio processing unit 225 and the delay measurement unit 226 are replaced with a radio processing unit 225b and a delay measurement unit 226b. Since the other configurations are the same as those in the example 1, explanations thereof are omitted.

The radio processing unit 225b detects a frame pulse, the delay measurement pulse, the RTD, and the clear flag from an overhead of the received radio frame. In addition, in a case where the radio processing unit 225b detects the delay measurement pulse, the RTD, and the clear flag, the radio processing unit 225b notifies the delay measurement unit 226b of the detection.

The processing of delay measurement unit 226b is similar to the processing of the delay measurement unit 226 until processing to measure a return processing time dt. In a case where the delay measurement unit 226b receives the notification of the RTD from the radio processing unit 225b, the delay measurement unit 226b calculates a transmission delay time by the above-described Expression (1). Additionally, in a case where the delay measurement unit 226b receives from the radio processing unit 225b a notification that it has detected the clear flag, the delay measurement unit 226b then performs correction on timing by modifying the count value using the transmission delay time. Specifically, the delay measurement unit 226b modifies the count value to the transmission delay time.

In other words, the second radio relay device 22b detects the clear flag after elapse of the transmission delay time after the count value of the counter 211 of the first radio relay device 21b is cleared. The second radio relay device 22b then sets the count value to be a value corresponding to the transmission delay time instead of setting it to be 0. After that, the count values of the counter 211 and the counter 221 are simultaneously cleared to be 0, after elapse of a time obtained by calculating "upper-limit value (Tmax)−transmission delay time". That is, the counter 211 and the counter 221 can be synchronized with each other. Therefore, the example 4 can simplify adjustment processing itself compared with the example 1.

Figure 9:
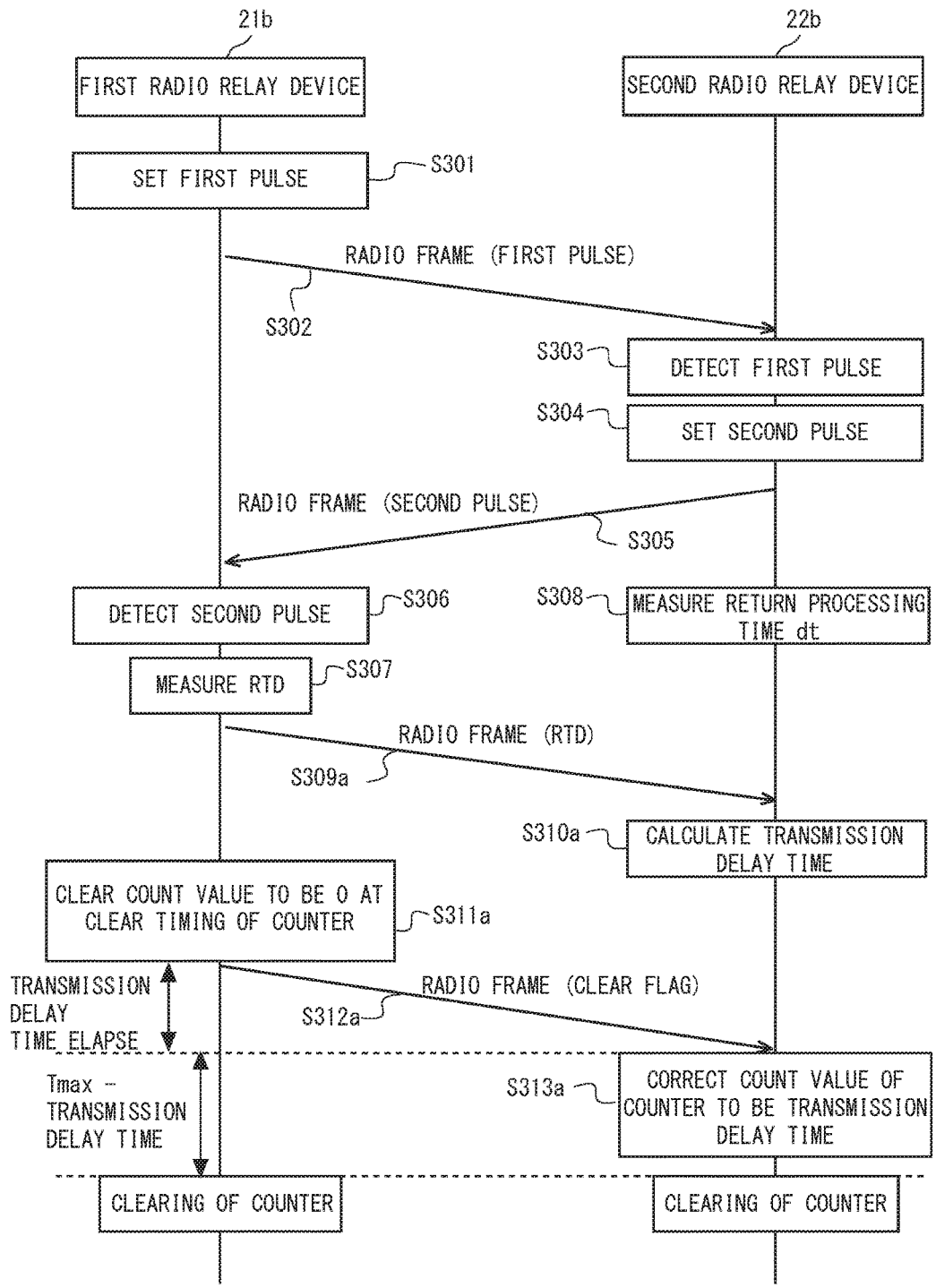
FIG. 9 is a sequence diagram showing a flow of calculation processing of a transmission delay time and adjustment processing of a correction value according to the example 4 of the present invention.

FIG. 9 is a sequence diagram showing a flow of calculation processing of the transmission delay time and adjustment processing of the correction value according to the example 4 of the present invention. Step S309 and subsequent steps shown in FIG. 5 are replaced with steps S309a, S310a, S311a, S312a, and S313a.

After step S307, the first radio relay device 21b transmits a radio frame including the RTD to the second radio relay device 22b (S309a). Thus, the RTD and the return processing time dt are aggregated in the second radio relay device 22b.

The second radio relay device 22b then calculates a transmission delay time using the RTD included in the received radio frame and the return processing time dt measured by the second radio relay device 22b itself (S310a).

Meanwhile, the first radio relay device 21b clears the count value so that it is 0 at clear timing of the counter 211 (S311a). Simultaneously with this, the first radio relay device 21b transmits a radio frame including a clear flag to the second radio relay device 22 (S312a). After elapse of the transmission delay time from step S311a, the second radio relay device 22b detects the clear flag from the received radio frame, and corrects the count value to the transmission delay time (S313a). Next, after elapse of a time obtained by calculating "the upper-limit value (Tmax)–the transmission delay time", the count values of the counter 211 and the counter 221 both reach the clear timing, and are synchronized with each other.

EXAMPLE 5

Next, an example 5, which is a specific example of the embodiment 1 of the present invention, will be explained. Differently from the example 4, the example 5 shows a case where "adjusting a correction value" shall mean adding a transmission delay time to the correction value.

Figure 10:
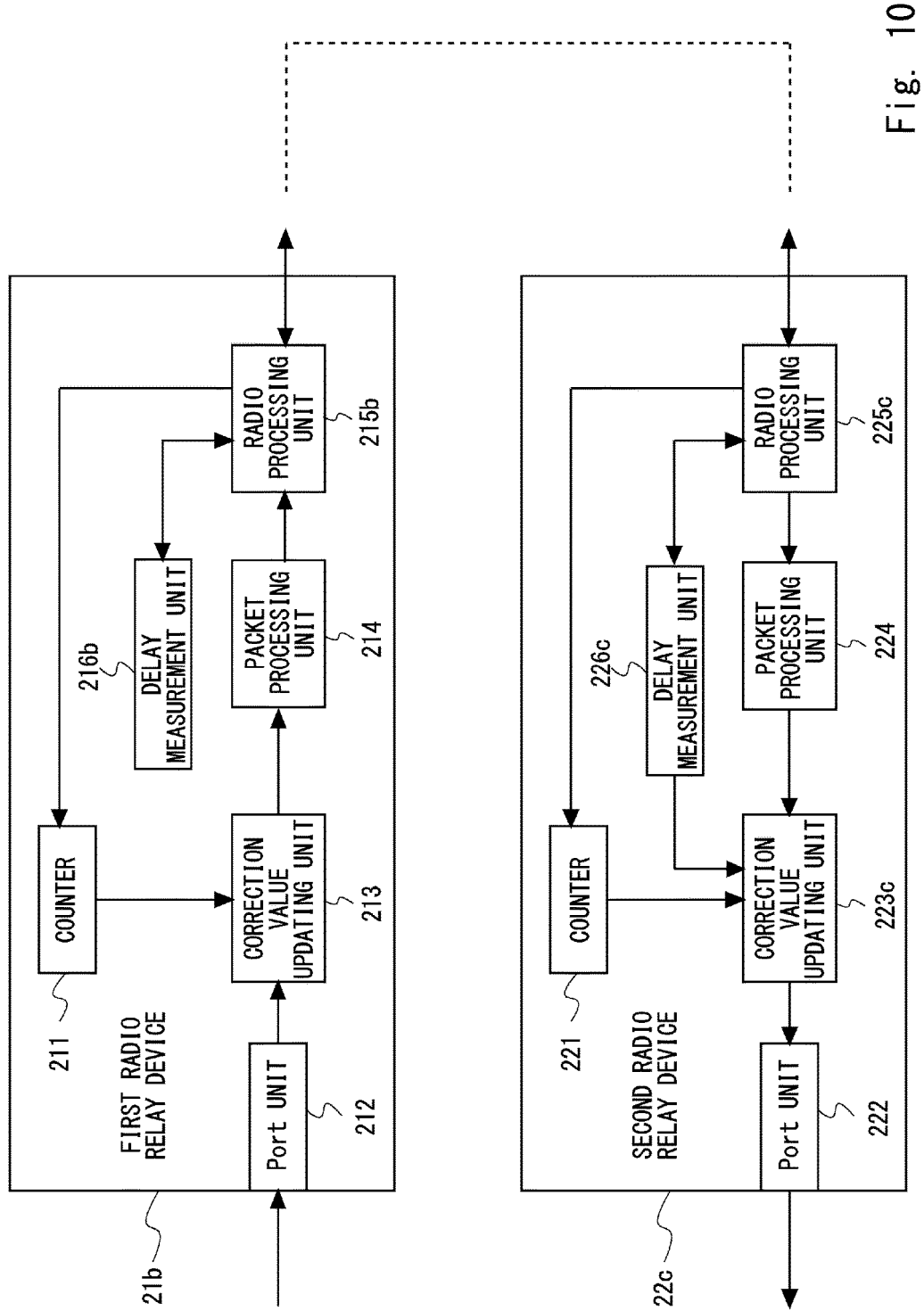
FIG. 10 is a block diagram showing configurations of two radio relay devices that perform radio communication according to an example 5 of the present invention.

FIG. 10 is a block diagram showing configurations of two radio relay devices that perform radio communication according to the example 5 of the present invention. The first radio relay device 21b is the same as the one shown in FIG. 8. In a second radio relay device 22c, different from the second radio relay device 22b of FIG. 8, the correction value updating unit 223 and the delay measurement unit 226b are replaced with a correction value updating unit 223c and a delay measurement unit 226c. Note that a radio processing unit 225c is equal to the radio processing unit 225b. Since the other configurations are the same as those in the example 4, explanations thereof are omitted.

After calculating a transmission delay time, the delay measurement unit 226c outputs the transmission delay time to the correction value updating unit 223c instead of performing correction of a count value of the counter 221. The correction value updating unit 223c then adjusts a correction value by adding to the correction value the transmission delay time received from the delay measurement unit 226c. Therefore, in step S28 of FIG. 6, the correction value updating unit 223c adds the count value of the counter 221 to the correction value, and also adds the transmission delay time to the correction value.

As described above, in the example 5, in contrast to the example 4, adjustment of clear timing becomes unnecessary, and thus the transmission delay time can be immediately reflected.

<Embodiment 2>

An embodiment 2 of the present invention shows a case where there are two relay devices opposed to a first radio relay device. However, the embodiment 2 of the present invention is applicable even if three or more relay devices opposed to the first radio relay device are employed.

Figure 11:
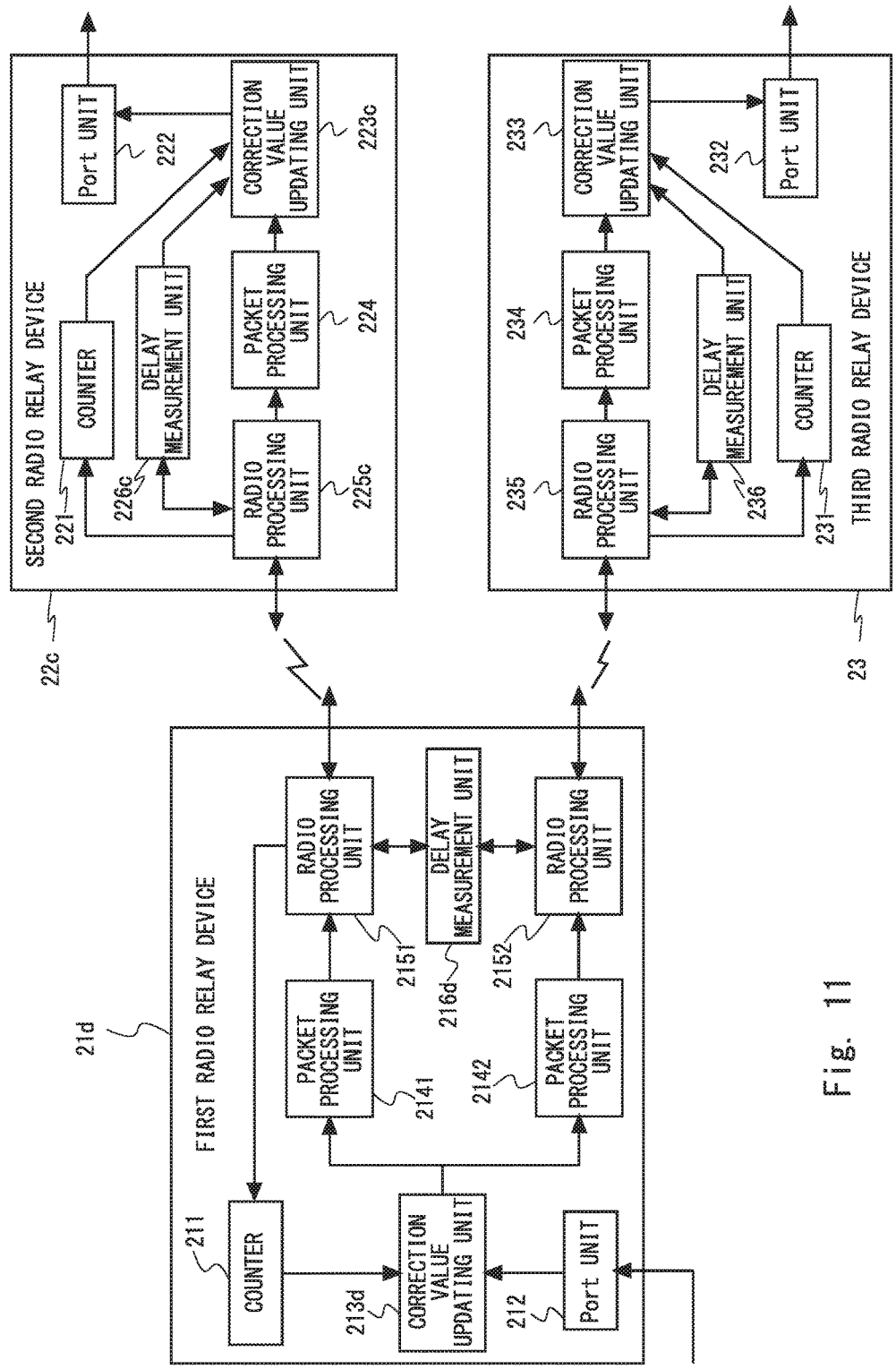
FIG. 11 is a block diagram showing configurations of three radio relay devices that perform radio communication according to an embodiment 2 of the present invention.

FIG. 11 is a block diagram showing configurations of three radio relay devices that perform radio communication according to the embodiment 2 of the present invention. FIG. 11 includes: a first radio relay device 21d; a second radio relay device 22c; and a third radio relay device 23.

In the first radio relay device 21d, different from the first radio relay device 21 of FIG. 3, the correction value updating unit 213, the packet processing unit 214, the radio processing unit 215, and the delay measurement unit 216 are replaced with a correction value updating unit 213d, packet processing units 2141 and 2142, radio processing units 2151 and 2152, and a delay measurement unit 216d. Since the other configurations are the same as those in the example 1, explanations thereof are omitted.

The correction value updating unit 213d outputs to both the packet processing units 2141 and 2142 a time synchronization packet including a correction value from which a counter value has been subtracted. Each of the packet processing units 2141 and 2142 independently performs packet processing the same as that performed by the packet processing unit 214, and outputs to each of the radio processing units 2151 and 2152 the time synchronization packet in which the packet processing has been performed, respectively.

The radio processing unit 2151 is the same as the radio processing unit 215. The radio processing unit 2152 is the same as the radio processing unit 215 except for notifying to the counter 211. Note that the radio processing unit 2152 may notify the counter 211 instead of the radio processing unit 2151 notifies the counter 211.

The delay measurement unit 216d performs processing of the delay measurement unit 216b of FIGS. 8 and 9 in both of the second radio relay device 22c and the third radio relay device 23. That is, the delay measurement unit 216d measures an RTD between the first radio relay device 21d and the second radio relay device 22c, outputs the measured RTD to the radio processing unit 2151, and instructs it to notify the second radio relay device 22c about this output. In addition, the delay measurement unit 216d measures an RTD between the first radio relay device 21d and the third radio relay device 23, outputs the measured RTD to the radio processing unit 2152, and instructs it to notify the third radio relay device 23 about this output.

The second radio relay device 22c performs radio communication with the radio processing unit 2151 of the first radio relay device 21d, which is the same as FIG. 10. The third radio relay device 23 performs radio communication with the radio processing unit 2152 of the first radio relay device 21d.

In addition, the third radio relay device 23 is a relay device that transfers a time packet to the other slave device (not shown) that performs time synchronization with the master device 13. The third radio relay device 23 is connected to the other device by a wired transmission path (not shown). Note that the third radio relay device 23 has a function equal to that of the second radio relay device 22c. Therefore, a counter 231, a Port unit 232, a correction value updating unit 233, a packet processing unit 234, a radio processing unit 235, and a delay measurement unit 236 of the third radio relay device 23 are the same as respective configurations of the corresponding second radio relay device 22c.

Thus, a communication system according to the embodiment 2 can calculate exactly the transmission delay time between the first radio relay device 21d and the second radio relay device 22c, and the transmission delay time between the first radio relay device 21d and the third radio relay device 23, respectively, and can also adjust exactly the correction values transferred to the respective slave devices.

Note that although equivalents of the radio relay devices 21b and 22c of the example 5 are applied to the second radio relay device and the third radio relay device in the above, equivalents of the radio relay devices 21b and 22b of the example 4 may be applied instead.

Note that the communication system according to the embodiment 2 can be achieved by adding the following configuration to the embodiment 2.

That is to say, the communication system further includes a third radio relay device that transfers the time synchronization packet received from the first radio relay device by the radio communication to the other slave device that performs the time synchronization.

In the communication system, the first radio relay device further transmits the first radio frame to the third radio relay device, the third radio relay device detects the first pulse from the received first radio frame, transmits to the first radio relay device a third radio frame in which a third pulse has been set according to the detection of the first pulse, and measures a third time from the detection of the first pulse to the setting of the third pulse, the first radio relay device detects the third pulse from the received third radio frame, measures a fourth time from the setting of the first pulse to the detection of the third pulse, and transmits the measured fourth time to the third radio relay device, and the third radio relay device calculates the transmission delay time using the fourth time received from the first radio relay device, and the third time measured by the third radio relay device itself, and adjusts the correction value using the calculated transmission delay time.

<Other Embodiments>

Note that the supplementary explanation will be given to the differences between the embodiments 1 and 2 of the present invention, and the above-mentioned Patent Literature 1. First, IEEE 1588 v2 requires extremely highly accurate time synchronization (accuracy of nano second order). A technology according to the above-mentioned Patent Literature 1 can be said to be the technology of multiplexing "relay times" generated in slave devices to a measurement response frame, performing time synchronization using a value of the measurement response frame, and measuring the relay times in the respective slave devices. However, since a master device and the respective slave devices usually operate with different clocks, fluctuations in clock intervals (count intervals) in the respective slave devices occur. Therefore, in a case where a counter of the master device is used as a standard, errors due to the fluctuations of the count intervals are generated among times measured as the "relay times" by counters of the respective slave devices. For example, assume that clock intervals used for each counter of the master device and the slave devices have a deviation of 100 ppm, respectively. At this time, in a case where it takes a transfer time of 100 us (micro second) for one slave device, an error of 100 ns (nano second) is generated. An error of up to 300 ns is generated among the three slave devices, i.e. an error of up to 600 ns is generated in a round trip, and thus it must be said that accuracy is insufficient as a highly accurate synchronization system.

Meanwhile, radio communication is assumed in the embodiment 1 of the present invention, and data is exchanged by a continuous frame called a "radio frame" in a radio section. The radio frame including a synchronization pulse called a frame pulse (FP) is regularly transmitted, and thereby clock synchronization is always performed. Accordingly, the first radio relay device and the second radio relay device are in a state where the count intervals are synchronized with each other. Therefore, in the example 1 of the present invention, the counter 211 of the first radio relay device 21 and the counter 221 of the second radio relay device 22 operate with clocks whose count intervals have been synchronized with each other, and thus an error due to fluctuations of the count intervals as in Patent Literature 1 is not generated.

Further, in a case where a packet for delay measurement as in Patent Literature 1 is used, it is necessary to multiplex information, such as a "destination", a "source", a "frame type", a "round-trip relay time", a "reference time", a "corrected master round-trip propagation delay time", a "preceding relay time" (paragraphs 0121 to 0124 of Patent Literature 1). Therefore, many resources of a line bandwidth are used. Although there is no problem in the case of a wide line bandwidth, a bandwidth may be narrow in a radio line depending on line conditions etc., and thus it is important to save the bandwidth.

Meanwhile, in the case of the embodiment 1 of the present invention, measurement of a delay needs only an exchange of pulses (1 bit), only the return processing time dt is needed as data exchanged between the master device and the slave device after the delay measurement in the cases of the examples 1 to 3, and only an RTD measurement result (T) is needed in the cases of the examples 4 and 5. Therefore, in the embodiment 1 of the present invention, an effect that the bandwidth can be saved is exerted.

Note that the first radio relay device 21 or the second radio relay device 22 according to the embodiment 1 exerts an equal effect if the following configuration is employed. That is to say, a radio relay device that is one of a plurality of radio relay devices that relay by radio communication a time synchronization packet including a correction value for performing time synchronization between a master device and a slave device that perform the time synchronization, the radio relay device including:

a radio communication unit that sets a first pulse in a first radio frame, transmits the first radio frame to the other radio relay device of the plurality of radio relay devices, receives a second radio frame that is returned to the first radio frame from the other radio relay device and in which a second pulse has been set, and detects the second pulse from the second radio frame;

a measurement unit that measures a transmission delay time between the radio relay device itself and the other radio relay device based on the setting of the first pulse and the detection of the second pulse; and an adjustment unit that adjusts the correction value included in the time synchronization packet using the transmission delay time.

In addition, although in the above-mentioned embodiments, the present invention has been explained as a configuration of hardware, the present invention is not limited to this. In the present invention, arbitrary processing can also be achieved by making a CPU (Central Processing Unit) execute a computer program.

In the above-mentioned examples, the program is stored using various types of non-transitory computer readable media, and can be supplied to a computer. The non-transitory computer readable media include various types of tangible storage media. Examples of the non-transitory computer readable media include: a magnetic recording medium (for example, a flexible disk, a magnetic tape, a hard disk drive); a magnetic optical recording medium (for example, a magnetic optical disk); a CD-ROM (Read Only Memory); a CD-R; a CD-R/W; a DVD (Digital Versatile Disc); a BD (Blu-ray (a registered trademark) Disc); and a semiconductor memory (for example, a mask ROM, a PROM (Programmable ROM), an EPROM (Erasable PROM), a flash ROM, an RAM (Random Access Memory)). In addition, the program may be supplied to the computer by various types of transitory computer readable media. Examples of the transitory computer readable media include an electrical signal, an optical signal, and an electromagnetic wave. The transitory computer readable medium can supply the program to the computer through a wired communication path, such as an electric wire and an optical fiber, or a wireless communication path.

Although a part of or all of the above-described embodiments can be described also as the following appendices, they are not limited to the following.

(Supplementary Note 1)

A communication system including:

a first radio relay device that receives a time synchronization packet including a correction value for performing time synchronization from a master device that performs the time synchronization, and transfers the time synchronization packet by radio communication; and a second radio relay device that transfers the time synchronization packet received from the first radio relay device by the radio communication to a slave device that performs the time synchronization, in which the first radio relay device transmits to the second radio relay device a first radio frame in which a first pulse has been set, the second radio relay device detects the first pulse from the received first radio frame, and transmits to the first radio relay device a second radio frame in which a second pulse has been set according to the detection of the first pulse, the first radio relay device detects the second pulse from the received second radio frame, and in which either one of the first radio relay device and the second radio relay device adjusts the correction value included in the time synchronization packet using a transmission delay time between the first radio relay device and the second radio relay device calculated based on at least the setting of the first pulse and the detection of the second pulse.

(Supplementary Note 2)

The communication system according to Supplementary Note 1, in which the first radio relay device measures a first time from the setting of the first pulse to the detection of the second pulse, the second radio relay device measures a second time from the detection of the first pulse to the setting of the second pulse, the first radio relay device and the second radio relay device aggregate the first time and the second time in the one relay device, and in which the one relay device calculates the transmission delay time based on the first time and the second time, and adjusts the correction value using the calculated transmission delay time.

(Supplementary Note 3)

The communication system according to Supplementary Note 2, in which the one relay device is the first radio relay device, the second radio relay device transmits the measured second time to the first radio relay device, and in which the first radio relay device calculates the transmission delay time using the second time received from the second radio relay device, and the first time measured by the first radio relay device itself, and adjusts the correction value using the calculated transmission delay time.

(Supplementary Note 4)

The communication system according to Supplementary Note 2, in which the one relay device is the second radio relay device, the first radio relay device transmits the measured first time to the second radio relay device, and in which the second radio relay device calculates the transmission delay time using the first time received from the first radio relay device, and the second time measured by the second radio relay device itself, and adjusts the correction value using the calculated transmission delay time.

(Supplementary Note 5)

The communication system according to any one of Appendices 1 to 4, in which in a first counter of the first radio relay device and a second counter of the second radio relay device, count intervals are in synchronization with each other by detection timing of a synchronization pulse included in an arbitrary radio frame transmitted and received between the first radio relay device and the second radio relay device, and in which the one relay device adjusts the correction value by performing correction on timing to clear a count value of a target counter of the one relay device based on the transmission delay time, the target counter being one of the first and the second counters.

(Supplementary Note 6)

The communication system according to Supplementary Note 5, in which the one relay device performs the correction on the timing by changing the timing to clear the count value of the target counter by the transmission delay time.

(Supplementary Note 7)

The communication system according to Supplementary Note 5, in which the one relay device performs the correction on the timing by modifying the count value using the transmission delay time at the timing to clear the count value of the target counter.

(Supplementary Note 8)

The communication system according to any one of Appendices 1 to 4, in which the one relay device adjusts the correction value by adding the transmission delay time to the correction value.

(Supplementary Note 9)

The communication system according to Supplementary Note 3, further including a third radio relay device that transfers the time synchronization packet received from the first radio relay device by the radio communication to the other slave device that performs the time synchronization, in which the first radio relay device further transmits the first radio frame to the third radio relay device, the third radio relay device detects the first pulse from the received first radio frame, transmits to the first radio relay device a third radio frame in which a third pulse has been set according to the detection of the first pulse, and measures a third time from the detection of the first pulse to the setting of the third pulse, the first radio relay device detects the third pulse from the received third radio frame, measures a fourth time from the setting of the first pulse to the detection of the third pulse, and transmits the measured fourth time to the third radio relay device, and in which the third radio relay device calculates the transmission delay time using the fourth time received from the first radio relay device, and the third time measured by the third radio relay device itself, and adjusts the correction value using the calculated transmission delay time.

(Supplementary Note 10)

The communication system according to any one of Appendices 1 to 8, in which the correction value is a sum of times when the time synchronization packet is retained in each relay device that relays the time synchronization packet between the master device and the slave device.

(Supplementary Note 11)

A time synchronization method in a communication system, the communication system including:

a first radio relay device that receives a time synchronization packet including a correction value for performing time synchronization from a master device that performs the time synchronization, and transfers the time synchronization packet by radio communication; and a second radio relay device that transfers the time synchronization packet received from the first radio relay device by the radio communication to a slave device that performs the time synchronization, in which the first radio relay device transmits to the second radio relay device a first radio frame in which a first pulse has been set, the second radio relay device detects the first pulse from the received first radio frame, and transmits to the first radio relay device a second radio frame in which a second pulse has been set according to the detection of the first pulse, the first radio relay device detects the second pulse from the received second radio frame, and in which either one of the first radio relay device and the second radio relay device adjusts the correction value included in the time synchronization packet using a transmission delay time between the first radio relay device and the second radio relay device calculated based on at least the setting of the first pulse and the detection of the second pulse.

(Supplementary Note 12)

A radio relay device that is one of a plurality of radio relay devices that relay by radio communication a time synchronization packet including a correction value for performing time synchronization between a master device and a slave device that perform the time synchronization, the radio relay device including:

a radio communication unit that sets a first pulse in a first radio frame, transmits the first radio frame to the other radio relay device of the plurality of radio relay devices, receives a second radio frame that is returned to the first radio frame from the other radio relay device and in which a second pulse has been set, and detects the second pulse from the second radio frame;

a measurement unit that measures a transmission delay time between the radio relay device itself and the other radio relay device based on the setting of the first pulse and the detection of the second pulse; and an adjustment unit that adjusts the correction value included in the time synchronization packet using the transmission delay time.

Hereinbefore, although the invention in the present application has been explained with reference to the embodiments, the invention in the present application is not limited by the above. Various changes that can be understood by those skilled in the art within the scope of the invention can be made to configurations and details of the invention in the present application.

This application claims priority based on Japanese Patent Application No. 2014-224840 filed on Nov. 5, 2014, and the entire disclosure thereof is incorporated herein.

REFERENCE SIGNS LIST 1000 communication system
11 GNSS satellite
12 GNSS receiver
13 master device
14 slave device
21 first radio relay device
21a first radio relay device
21b first radio relay device
21c first radio relay device
21d first radio relay device
211 counter
212 Port unit
213 correction value updating unit
213a correction value updating unit
213d correction value updating unit
214 packet processing unit
2141 packet processing unit
2142 packet processing unit
215 radio processing unit
2151 radio processing unit
2152 radio processing unit
215c radio processing unit
216 delay measurement unit
216b delay measurement unit
216c delay measurement unit
216d delay measurement unit
22 second radio relay device
22b second radio relay device
22c second radio relay device
221 counter
222 Port unit
223 correction value updating unit
223c correction value updating unit
224 packet processing unit
225 radio processing unit
225b radio processing unit
225c radio processing unit
226 delay measurement unit
226b delay measurement unit
226c delay measurement unit
23 third radio relay device
231 counter
232 Port unit
233 correction value updating unit
234 packet processing unit
235 radio processing unit
236 delay measurement unit
31 wired transmission path
32 wired transmission path
33 radio transmission path
RF1 radio frame group
F1 radio frame
F11 overhead
F12 payload
F13 overhead
F14 payload
P11 frame pulse
P12 delay measurement pulse
PTP time synchronization packet
CF correction value
RF2 radio frame group F2 radio frame
F21 overhead
F22 payload
P21 frame pulse
P22 delay measurement pulse

The invention claimed is:
1. A communication system comprising:
a first radio relay device; and
a second radio relay device,
wherein the first radio relay device comprises:
　at least one memory storing instructions, and
　at least one processor configured to execute the instructions to:
　　receive a time synchronization packet including a correction value for performing time synchronization from a master device that performs the time synchronization, and transfer the time synchronization packet by radio communication;
wherein the second radio relay device comprises:
　at least one memory storing instructions; and
　at least one processor configured to execute the instructions to:
　　transfer the time synchronization packet received from the first radio relay device by the radio communication to a slave device that performs the time synchronization;
wherein the at least one processor of the first radio relay device is further configured to execute the instructions to transmit to the second radio relay device a first radio frame in which a first pulse has been set,
wherein the at least one processor of the second radio relay device is further configured to execute the instructions to detect the first pulse from the received first radio frame, and transmits to the first radio relay device a second radio frame in which a second pulse has been set according to the detection of the first pulse,
wherein the at least one processor of the first radio relay device is further configured to execute the instructions to detect the second pulse from the received second radio frame,
wherein the at least one processor of either one of the first radio relay device and the second radio relay device is further configured to execute the instructions to adjust the correction value included in the time synchronization packet using a transmission delay time between the first radio relay device and the second radio relay device calculated based on at least the setting of the first pulse and the detection of the second pulse, and
wherein the correction value is a sum of times the time synchronization packet is retained in each relay device that relays the time synchronization packet between the master device and the slave device.

2. The communication system according to claim 1, wherein
the at least one processor of the first radio relay device is further configured to execute the instructions to measure a first time from the setting of the first pulse to the detection of the second pulse,
the at least one processor of the second radio relay device is further configured to execute the instructions to measure a second time from the detection of the first pulse to the setting of the second pulse,
the at least one processor of the first radio relay device and the second radio relay device is further configured to execute the instructions to aggregate the first time and the second time in one relay device, and
the at least one processor of the one relay device is further configured to execute the instructions to calculate the transmission delay time based on the first time and the second time, and adjusts the correction value using the calculated transmission delay time.

3. The communication system according to claim 2, wherein
the one relay device is the first radio relay device,
the at least one processor of the second radio relay device is further configured to execute the instructions to transmit the measured second time to the first radio relay device, and
the at least one processor of the first radio relay device is configured to execute the instructions to calculate the transmission delay time using the second time received from the second radio relay device and the first time measured by the first radio relay device itself, and adjusts the correction value using the calculated transmission delay time.

4. The communication system according to claim 2, wherein
the one relay device is the second radio relay device,
the at least one processor of the first radio relay device is further configured to execute the instructions to transmit the measured first time to the second radio relay device, and
the at least one processor of the second radio relay device is further configured to execute the instructions to calculate the transmission delay time using the first time received from the first radio relay device and the second time measured by the second radio relay device itself, and adjust the correction value using the calculated transmission delay time.

5. The communication system according to claim 4, further comprising a third radio relay device,
wherein the third radio relay device comprises:
　at least one memory storing instructions, and
　at least one processor configured to execute the instructions to:
　　transfer the time synchronization packet received from the first radio relay device by the radio communication to the other slave device that performs the time synchronization,
wherein the at least one processor of the first radio relay device is further configured to execute the instructions to transmit the first radio frame to the third radio relay device,
wherein the at least one processor of the third radio relay device is further configured to execute the instructions to detect the first pulse from the received first radio frame, transmits to the first radio relay device a third radio frame in which a third pulse has been set according to the detection of the first pulse, and measure a third time from the detection of the first pulse to the setting of the third pulse,
wherein the at least one processor of the first radio relay device is further configured to execute the instructions to detect the third pulse from the received third radio frame, measures a fourth time from the setting of the first pulse to the detection of the third pulse, and transmit the measured fourth time to the third radio relay device, and
wherein the at least one processor of the third radio relay device is further configured to execute the instructions to calculate the transmission delay time using the fourth time received from the first radio relay device and the third time measured by the third radio relay device itself, and adjust the correction value using the calculated transmission delay time.

6. The communication system according to claim 1, wherein
in a first counter of the first radio relay device and a second counter of the second radio relay device, count intervals are in synchronization with each other by detection timing of a synchronization pulse included in an arbitrary radio frame transmitted and received between the first radio relay device and the second radio relay device, and
at least one processor of one relay device is configured to execute the instructions to adjust the correction value by performing correction on timing to clear a count value of a target counter of the one relay device based on the transmission delay time, the target counter being one of the first and the second counters.

7. The communication system according to claim 6, wherein the at least one processor of the one relay device is configured to execute the instructions to perform the correction on the timing by changing the timing to clear the count value of the target counter by the transmission delay time.

8. The communication system according to claim 6, wherein the at least one processor of the one relay device is configured to execute the instructions to perform the correction on the timing by modifying the count value using the transmission delay time at the timing to clear the count value of the target counter.

9. The communication system according to claim 1, wherein the at least one processor of one relay device is configured to execute the instructions to adjust the correction value by adding the transmission delay time to the correction value.

10. A time synchronization method in a communication system, the communication system including:
a first radio relay device that receives a time synchronization packet including a correction value for performing time synchronization from a master device that performs the time synchronization, and transfers the time synchronization packet by radio communication; and
a second radio relay device that transfers the time synchronization packet received from the first radio relay device by the radio communication to a slave device that performs the time synchronization, wherein
transmitting, by the first radio relay device, to the second radio relay device a first radio frame in which a first pulse has been set,
detecting, by the second radio relay device, the first pulse from the received first radio frame, and transmits to the first radio relay device a second radio frame in which a second pulse has been set according to the detection of the first pulse,
detecting, by the first radio relay device, the second pulse from the received second radio frame, and
adjusting, by either one of the first radio relay device and the second radio relay device, the correction value included in the time synchronization packet using a transmission delay time between the first radio relay device and the second radio relay device calculated based on at least the setting of the first pulse and the detection of the second pulse,
wherein the correction value is a sum of times the time synchronization packet is retained in each relay device that relays the time synchronization packet between the master device and the slave device.

11. A radio relay device that is one of a plurality of radio relay devices that relay by radio communication a time synchronization packet including a correction value for performing time synchronization between a master device and a slave device that perform the time synchronization, the radio relay device comprising:
at least one memory storing instructions, and
at least one processor configured to execute the instructions to:
set a first pulse to a first radio frame,
transmit the first radio frame to the other radio relay device of the plurality of radio relay devices,
receive a second radio frame in which a second pulse has been set from the other radio relay device, the second radio frame is sent back in response to the reception of the first radio frame at the other radio relay device,
detect the second pulse from the second radio frame,
measure a transmission delay time between the radio relay device itself and the other radio relay device based on the setting of the first pulse and the detection of the second pulse; and
adjust the correction value included in the time synchronization packet using the transmission delay time,
wherein the correction value is a sum of times the time synchronization packet is retained in each relay device that relays the time synchronization packet between the master device and the slave device.

* * * * *

UNITED STATES PATENT AND TRADEMARK OFFICE
CERTIFICATE OF CORRECTION

PATENT NO. : 10,333,611 B2  
APPLICATION NO. : 15/524410  
DATED : June 25, 2019  
INVENTOR(S) : Makoto Otsu and Shuhei Munetsugu Page 1 of 1

It is certified that error appears in the above-identified patent and that said Letters Patent is hereby corrected as shown below:

In the Specification

Column 5, Brief Description of Drawings, Line 3; After "example", insert --3--

Signed and Sealed this  
Twenty-ninth Day of October, 2019

Andrei Iancu  
*Director of the United States Patent and Trademark Office*